US009558311B2

(12) United States Patent
Matsumoto

(10) Patent No.: US 9,558,311 B2
(45) Date of Patent: Jan. 31, 2017

(54) SURFACE REGION SELECTION FOR HEAT SINK PLACEMENT

(71) Applicant: International Business Machines Corporation, Armonk, NY (US)

(72) Inventor: Keiji Matsumoto, Yokohama (JP)

(73) Assignee: International Business Machines Corporation, Armonk, NY (US)

( * ) Notice: Subject to any disclaimer, the term of this patent is extended or adjusted under 35 U.S.C. 154(b) by 67 days.

(21) Appl. No.: 14/525,292

(22) Filed: Oct. 28, 2014

(65) Prior Publication Data

US 2015/0121331 A1 Apr. 30, 2015

(30) Foreign Application Priority Data

Oct. 31, 2013 (JP) ................................ 2013-226674

(51) Int. Cl.
*G06F 17/50* (2006.01)

(52) U.S. Cl.
CPC ....... *G06F 17/5077* (2013.01); *G06F 17/5068* (2013.01); *G06F 2217/78* (2013.01); *G06F 2217/80* (2013.01); *H01L 2224/16145* (2013.01); *H01L 2224/16225* (2013.01); *H01L 2924/15311* (2013.01)

(58) Field of Classification Search
USPC ......................................................... 716/137
See application file for complete search history.

(56) References Cited

U.S. PATENT DOCUMENTS 5,786,635 A * 7/1998 Alcoe .................. H01L 21/563
257/706

FOREIGN PATENT DOCUMENTS

| JP | 5259328 A | 10/1993 |
|----|-----------|---------|
| JP | 9312362 A | 12/1997 |
| JP | 2000228466 A | 8/2000 |

(Continued)

OTHER PUBLICATIONS

Matsumoto et al., "Investigations of Cooling Solutions for Three-dimensional (3D) Chip Stacks," 26th Annual IEEE Semiconductor Thermal Measurement and Management Symposium, Feb. 21-25, 2010, pp. 25-32, Santa Clara, CA, © 2010 IEEE DOI: 10.1109/STHERM.2010.5444319.

(Continued)

*Primary Examiner* — Eric Lee
(74) *Attorney, Agent, or Firm* — Nicholas D. Bowman

(57) ABSTRACT

A method for determining an area of a region for receiving a heat sink on a surface of a chip-supporting substrate is disclosed. The method can include determining, in response to a specified voltage drop associated with substrate wiring, a first set of wiring cross-sectional areas and corresponding lengths that satisfy the specified voltage drop. The method can also include determining, by selecting, in response to a specified thermal resistance associated with substrate wiring and insulating layers, from the first set, a second set of wiring cross-sectional areas and corresponding lengths that satisfy the specified thermal resistance. The method can also include selecting, from a set of placement areas corresponding to the second set of wiring cross-sectional areas and corresponding lengths, a heat sink placement area that is greater than a lower size for a placement area and less than an upper size for a placement area.

10 Claims, 19 Drawing Sheets

(56) References Cited

FOREIGN PATENT DOCUMENTS

| | | |
|---|---|---|
| JP | 2001135753 A | 5/2001 |
| JP | 2001189534 A | 7/2001 |
| JP | 2002270743 A | 9/2002 |
| JP | 2004165281 A | 6/2004 |
| JP | 2006156721 A | 6/2006 |
| JP | 2006165383 A | 6/2006 |
| JP | 2012253167 A | 12/2012 |
| WO | 2008013279 A1 | 1/2008 |

OTHER PUBLICATIONS

JP Application 2013-226674, entitled "Method for Setting Surface Region for Arranging Heatsink on Rear Face of Wiring Portion of Chip Supporting Substrate, Chip Supporting Substrate, and Chip Mounting Structure," Filed Oct. 31, 2013.

\* cited by examiner

300
Method for Selecting a Surface Region
for Arranging a Heat Sink Thereon

310

DETERMINE SET OF CROSS-SECTIONAL AREA AND LENGTH OF ELECTRICALLY CONDUCTIVE LAYER TO SATISFY PERMISSIBLE VALUE OF VOLTAGE DROP ASSOCIATED WITH ELECTRICALLY CONDUCTIVE LAYER OF WIRING PORTION.

320

DETERMINE SET OF LENGTHS OF ELECTRICALLY CONDUCTIVE LAYER AND INSULATING LAYER, SUCH THAT ELECTRICALLY CONDUCTIVE LAYER AND INSULATING LAYER WHEN HAVING BEEN SET SO AS TO HAVE CROSS-SECTIONAL AREA OUT OF SET OF CROSS-SECTIONAL AREA AND LENGTH OF ELECTRICALLY CONDUCTIVE LAYER THAT HAS BEEN DETERMINED FOR PERMISSIBLE VALUE OF VOLTAGE DROP SATISFY DESIRED VALUE OF THERMAL RESISTANCE ASSOCIATED WITH ELECTRICALLY CONDUCTIVE LAYER AND INSULATING LAYER OF WIRING PORTION.

330

SELECT LENGTH OF ELECTRICALLY CONDUCTIVE LAYER CORRESPONDING TO CROSS-SECTIONAL AREA OF ELECTRICALLY CONDUCTIVE LAYER TO BE USED, FROM SET OF CROSS-SECTIONAL AREA AND LENGTH OF ELECTRICALLY CONDUCTIVE LAYER WHICH HAS BEEN DETERMINED FOR PERMISSIBLE VALUE OF VOLTAGE DROP, SET AREA DETERMINED BY SELECTED LENGTH OF ELECTRICALLY CONDUCTIVE LAYER AT THE MAXIMUM VALUE, SELECT LENGTHS OF ELECTRICALLY CONDUCTIVE LAYER AND INSULATING LAYER CORRESPONDING TO CROSS-SECTIONAL AREA OF ELECTRICALLY CONDUCTIVE LAYER TO BE USED, FROM SET OF LENGTHS OF ELECTRICALLY CONDUCTIVE LAYER AND INSULATING LAYER WHICH HAS BEEN DETERMINED FOR DESIRED VALUE OF THERMAL RESISTANCE, SET AREA DETERMINED BY SELECTED LENGTHS OF ELECTRICALLY CONDUCTIVE LAYER AND INSULATING LAYER AT THE MINIMAL VALUE, AND SET SURFACE REGION FOR ARRANGING HEATSINK THEREON TO AREA IN RANGE BETWEEN THE MAXIMAL VALUE AND THE MINIMAL VALUE.

FIG. 3

SURFACE REGION SELECTION FOR HEAT SINK PLACEMENT

CROSS REFERENCE TO RELATED APPLICATION

This application claims priority to Japanese Patent Application No. 2013-226674, filed Oct. 31, 2013, which is incorporated herein in its entirety.

BACKGROUND

The present disclosure generally relates to a technology for mounting an integrated circuit (IC) chip (hereafter referred to simply as "chip"). In particular, this disclosure relates to a method for selecting a surface region for arranging a heat sink thereon for removing heat from a chip on a rear face of a wiring portion of a chip-supporting substrate, a chip-supporting substrate on which a surface region for arranging a heat sink thereon is set, and a chip mounting structure which mounts a chip on the chip-supporting substrate.

For instance, in a chip mounting structure which has chips stacked three-dimensionally and mounted therein with a face-down bonding method, and has high heat generation density, it is desired to cool the flip chip not only from the upper face side of the flip chip but also from a chip-supporting substrate side which is the lower face side of the flip chip. Patent Document 1 (JP2002-270743A) describes a mounting structure which mounts a semiconductor apparatus including a chip, a chip bump, an interposer, and a ball grid array (BGA) bump of the interposer on a predetermined position of a printed wiring board having a core layer, arranges a heat sink for radiating heat of the chip in the core layer, and further has a via for heat radiation for transmitting the heat generated in the chip to the heat sink provided in the printed wiring board so as to thermally connect the BGA bump of the interposer with the heat sink. In this mounting structure, the via for heat radiation is provided in the printed wiring board under the chip. Accordingly, a wiring layer cannot be provided under the chip in the printed wiring board, but is routed up to the outer periphery of the chip, and is provided so as to surround the heat sink.

SUMMARY

Certain embodiments are directed towards a method for determining an area of a region for receiving a heat sink on a surface of a chip-supporting substrate. The method can include determining a set of a cross-sectional area and a length of an electrically conductive layer from a permissible value of a voltage drop associated with the electrically conductive layer of a wiring portion to satisfy the permissible value of the voltage drop. Certain embodiments of the method also include determining a set of lengths of the electrically conductive layer and an insulating layer from a desired value of thermal resistance associated with the electrically conductive layer and the insulating layer of the wiring portion, such that the electrically conductive layer and the insulating layer when having been set so as to have the cross-sectional area out of the set of the cross-sectional area and the length of the electrically conductive layer that has been determined for the permissible value of the voltage drop satisfy the desired value of the thermal resistance. Particular embodiments of the method also include selecting a length of an electrically conductive layer corresponding to the cross-sectional area of an electrically conductive layer to be used, from the set of the cross-sectional area and the length of the electrically conductive layer which has been determined for the permissible value of the voltage drop, setting an area determined by a selected length of the electrically conductive layer at a maximum value, selecting lengths of the electrically conductive layer and the insulating layer corresponding to the cross-sectional area of the electrically conductive layer to be used, from the set of the lengths of the electrically conductive layer and the insulating layer which has been determined for the desired value of the thermal resistance, setting an area determined by selected lengths of the electrically conductive layer and the insulating layer at a minimal value, and setting a surface region for arranging the heat sink thereon to an area in a range between the maximum value and the minimal value.

Certain embodiments are directed towards a method for determining an area of a region for receiving a heat sink on a surface of a chip-supporting substrate is disclosed. The method can include determining, in response to a specified voltage drop associated with electrically conductive substrate wiring, a first set of wiring cross-sectional areas and corresponding lengths that satisfy the specified voltage drop. Particular embodiments also include determining, by selecting, in response to a specified thermal resistance associated with substrate electrically conductive and insulating layers, from the first set, a second set of electrically conductive wiring cross-sectional areas and corresponding lengths that satisfy the specified thermal resistance. The method can include determining an upper size for the placement area based upon lengths that satisfy the specified voltage drop, and also, determining a lower size for a placement area based upon the lengths that satisfy the specified thermal resistance. The method can also include selecting, from a set of placement areas corresponding to the second set of wiring cross-sectional areas and corresponding lengths, a heat sink placement area that is greater than the lower size for the placement area and less than the upper size for the placement area.

The above summary is not intended to describe each illustrated embodiment or every implementation of the present disclosure.

BRIEF DESCRIPTION OF THE DRAWINGS

The drawings included in the present application are incorporated into, and form part of, the specification. They illustrate embodiments of the present disclosure and, along with the description, serve to explain the principles of the disclosure. The drawings are only illustrative of certain embodiments and do not limit the disclosure.

FIG. 3 is a flow diagram of a method for selecting, for arranging the heat sink thereon, the surface region on the rear face of the wiring portion of the chip-supporting substrate, according to embodiments consistent with the figures.

Figure 1:
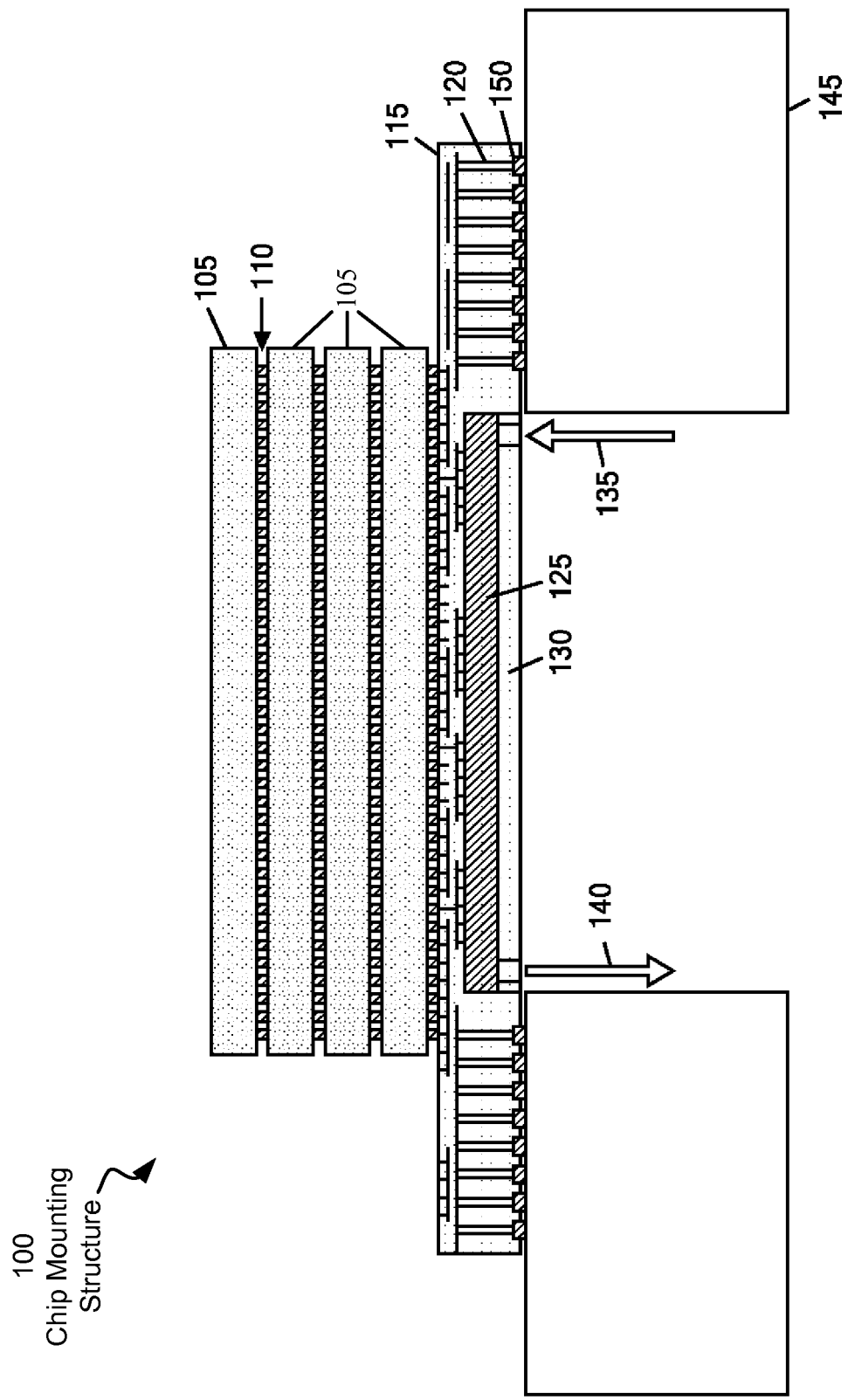
FIG. 1 is a cross-sectional drawing depicting a conventional chip mounting structure in which a heat sink is provided on an interposer, according to embodiments of the present disclosure.

While the invention is amenable to various modifications and alternative forms, specifics thereof have been shown by way of example in the drawings and will be described in detail. It should be understood, however, that the intention is not to limit the invention to the particular embodiments described. On the contrary, the intention is to cover all modifications, equivalents, and alternatives falling within the spirit and scope of the invention.

In the drawings and the Detailed Description, like numbers generally refer to like components, parts, steps, and processes.

DETAILED DESCRIPTION

Certain embodiments of the present disclosure can be appreciated in the context of providing enhanced heat removal for a single integrated circuit chip such as a microprocessor or a graphics processor used to provide computational and graphics processing capabilities for computers and computing systems. Such computers and computing systems can include, but are not limited to personal computers, mainframe computers, servers and gaming systems. While not necessarily limited thereto, embodiments discussed in this context can facilitate an understanding of various aspects of the disclosure. Certain embodiments are directed towards other equipment and associated applications, such as providing enhanced heat removal for a three-dimensional stack of integrated circuit chips such as an advanced memory device or hybrid memory and processor device, which may be used in a wide variety of computers computer and other electronic systems. Such systems can include, but are not limited to, supercomputers, high-performance computing (HPC) systems, and other types of special-purpose computers.

Embodiments will be described below with reference to the drawings, but the following embodiments are not intended to limit the present disclosure according to the claims. All combinations of features described in the embodiments are not necessarily essential to the solving means for the disclosure. The present disclosure can be carried out in many different forms, and should not be restrictively interpreted by the described contents of the embodiments. Incidentally, the same components or members as those in the whole description of the embodiments are denoted by the same reference numerals.

Non-Patent Document 1 (Keiji Matsumoto et al., Investigations of Cooling Solutions for Three-Dimensional (3D) Chip Stacks, in Semiconductor Thermal Measurement and Management Symposium, 2010. SEMI-THERM 2010. 26th Annual IEEE, 23 Feb. 2010, pp. 25-32) describes a chip mounting structure 100 which is cooled from the lower face side of the chip, as illustrated in FIG. 1. In the chip mounting structure 100, chips 105 are three-dimensionally stacked through bonding members 110 such as a solder bump, for instance, and are mounted on a silicon interposer 115. In particular embodiments, the silicon interposer 115 has a micro channel 125 which has a heat sink fin directly formed thereon, and a lid 130 provided on its rear face so as to correspond to a position on which the chips 105 are mounted. A coolant can enter the micro channel 125 from the side shown by an arrow 135 and exit from the side shown by an arrow 140. In certain embodiments, the silicon interposer 115 has wiring formed on a top surface through the use of a back-end-of-line (BEOL) process. Because the micro channel 125 is provided under the chip 105 in the inner part of the silicon interposer 115, the wire is routed up to the outer periphery of the chip 105, passes through an electrically conductive through-via 120 which is provided on the outer periphery in the silicon interposer 115, and is connected to an electrode 150 of the printed wiring board 145.

The chip mounting structure 100 (FIG. 1) of Non-Patent Document 1 can have favorable heat radiation characteristics when compared to heat radiation characteristics of a structure described in Patent Document 1 (JP2002-270743A). Chip mounting structure 100 (FIG. 1) has a heat sink arranged in a printed wiring board 145, because a micro channel 125 of a heat sink is arranged in a silicon interposer 115 which mounts a chip 105 thereon. In particular embodiments however, a wiring layer within silicon interposer 115 which connects the chip 105 to the printed wiring board 145 is still routed to a peripheral portion of the chip 105 and is therefore extended. In addition, the cross-sectional area of wires on the surface of silicon interposer 115 can be narrowed in comparison to wiring on printed wiring board 145. As a result, the electrical resistance of the silicon interposer 115 wires increases, which results in an increased voltage drop across the wires.

Accordingly, the chip mounting structure 100 can offer improved characteristics, as a chip mounting structure. As the cross-sectional area of a wiring layer increases, the electrical resistance of the wiring layer decreases, and accordingly the voltage drop increases in proportion to the cross-sectional area of the wiring layer. However, as the cross-sectional area of the wiring layer increases, the thicknesses of the wiring layer and an insulating layer may increase and accordingly, the thermal resistance of the wiring layer may increase. Accordingly, the thermal characteristics of the heat radiation deteriorate in proportion to the thicknesses of the wiring layer and the insulating layer. It may be difficult to simultaneously improve both the voltage drop characteristics and the thermal characteristics of a chip mounting structure.

In certain embodiments, a chip mounting technology is created by which the wiring layer and the insulating layer is configured to produce both favorable wiring electrical characteristics (voltage drop) and thermal characteristics (heat radiation).

In certain embodiments, a method is provided for selecting, on the rear face of the wiring portion of a chip-supporting substrate, a surface region for arranging the heat sink thereon. In certain embodiments, a chip-supporting substrate is provided in which the surface region for arranging the heat sink thereon is set, and a chip mounting structure which mounts the chip on the chip-supporting substrate.

According to embodiments, a method can be used for selecting a surface region for arranging a heat sink thereon on a rear face of a wiring portion of a chip-supporting substrate. The method can include: determining a selected set of a cross-sectional areas and lengths of an electrically conductive layer from a specified (permissible) value of a voltage drop associated with the electrically conductive layer of the wiring portion to satisfy the specified (permissible) value of the voltage drop, determining a set of lengths of the electrically conductive layer and an insulating layer from a desired value of thermal resistance associated with the electrically conductive layer and the insulating layer of the wiring portion, such that the electrically conductive layer and the insulating layer when having been selected so as to have the cross-sectional area out of the set of the cross-sectional area and the length of the electrically conductive layer that has been determined for the specified value of the voltage drop satisfy the desired value of the thermal resistance. In certain embodiments, the method also includes selecting a length of an electrically conductive layer corresponding to the cross-sectional area of an electrically conductive layer to be used, from the set of the cross-sectional area and the length of the electrically conductive layer which has been determined for the specified value of the voltage drop, selecting an area determined by the selected length of the electrically conductive layer at the maximum value, selecting lengths of the electrically conductive layer and the insulating layer corresponding to the cross-sectional area of the electrically conductive layer to be used, from the set of the lengths of the electrically conductive layer and the insulating layer which has been determined for the desired value of the thermal resistance, selecting an area determined by the selected lengths of the electrically conductive layer and the insulating layer at the minimal value, and selecting the surface region for arranging a heat sink thereon to an area in the range between the maximum value and the minimal value.

In certain embodiments, determining the set of the cross-sectional area and the length of the electrically conductive layer includes determining a resistance value of the electrically conductive layer from the specified value of the voltage drop and a value of an electric current flowing in the electrically conductive layer, and determining a set of the cross-sectional area and the length of the electrically conductive layer to match the determined resistance value.

In certain embodiments, determining the set of the lengths of the electrically conductive layer and the insulating layer includes determining a value of effective thermal conductivity of the wiring portion from a composition ratio between the electrically conductive layer and the insulating layer, determining a value of thermal resistance associated with the electrically conductive layer and the insulating layer with the use of the determined value of the effective thermal conductivity, and determining a set of the lengths of the electrically conductive layer and the insulating layer, such that the determined value of the thermal resistance becomes the desired value of the thermal resistance.

According to particular embodiments, a chip-supporting substrate having a surface region for arranging a heat sink thereon set on a rear face of a wiring portion of the chip-supporting substrate is created by: determining a set of a cross-sectional area and a length of an electrically conductive layer to satisfy a specified value of a voltage drop associated with the electrically conductive layer of a wiring portion to be provided, from the specified value of the voltage drop, determining a set of lengths of the electrically conductive layer and an insulating layer from a desired value of thermal resistance associated with the electrically conductive layer and the insulating layer of the wiring portion, such that the electrically conductive layer and the insulating layer when having been selected so as to have the cross-sectional area out of the set of the cross-sectional area and the length of the electrically conductive layer that has been determined for the specified value of the voltage drop satisfy the desired value of the thermal resistance and selecting a length of an electrically conductive layer corresponding to the cross-sectional area of an electrically conductive layer to be used, from the set of the cross-sectional area and the length of the electrically conductive layer which has been determined for the specified value of the voltage drop, selecting an area determined by the selected length of the electrically conductive layer at the maximum value, selecting lengths of the electrically conductive layer and the insulating layer corresponding to the cross-sectional area of the electrically conductive layer to be used, from the set of the lengths of the electrically conductive layer and the insulating layer which has been determined for the desired value of the thermal resistance, selecting an area determined by the selected lengths of the electrically conductive layer and the insulating layer at the minimal value, and selecting the surface region for arranging the heat sink thereon to an area in a range between the maximum value and the minimal value, on a rear face of the wiring portion.

In certain embodiments, determining the set of the cross-sectional area and the length of the electrically conductive layer includes determining a resistance value of the electrically conductive layer from the specified value of the voltage drop and a value of an electric current flowing in the electrically conductive layer, and determining a set of the cross-sectional area and the length of the electrically conductive layer to match the determined resistance value.

In certain embodiments, determining the set of the lengths of the electrically conductive layer and the insulating layer includes determining a value of effective thermal conductivity of the wiring portion from a composition ratio between the electrically conductive layer and the insulating layer, determining a value of thermal resistance associated with the electrically conductive layer and the insulating layer with the use of the determined value of the effective thermal conductivity, and determining a set of the lengths of the electrically conductive layer and the insulating layer, such that the determined value of the thermal resistance becomes the desired value of the thermal resistance.

In certain embodiments, a recess is provided on the rear face of the wiring portion of the chip supporting substrate, and a bottom face of the recess becomes the surface region for arranging the heat sink thereon.

In certain embodiments, an interposer to be connected to the chip is provided on a surface of the wiring portion, the interposer having an electrically conductive through-via within a range having the size of the plane of the chip.

According to certain embodiments, a chip mounting structure includes: a flip chip; a chip-supporting substrate which has the flip chip mounted thereon and has a surface region for arranging a heat sink thereon selected on a rear face of a wiring portion of the chip-supporting substrate. The chip mounting structure can be created by determining a set of a cross-sectional area and a length of an electrically conductive layer to satisfy a specified value of a voltage drop associated with the electrically conductive layer of the wiring portion to be provided, from the specified value of the voltage drop, determining a set of lengths of the electrically conductive layer and an insulating layer from a desired value of thermal resistance associated with the electrically conductive layer and the insulating layer of the wiring portion, such that the electrically conductive layer and the insulating layer when having been selected so as to have the cross-sectional area out of the set of the cross-sectional area and the length of the electrically conductive layer that has been determined for the specified value of the voltage drop satisfy the desired value of the thermal resistance and selecting a length of an electrically conductive layer corresponding to the cross-sectional area of an electrically conductive layer to be used, from the set of the cross-sectional area and the length of the electrically conductive layer which has been determined for the specified value of the voltage drop, selecting an area determined by the selected length of the electrically conductive layer at the maximum value, selecting lengths of the electrically conductive layer and the insulating layer corresponding to the cross-sectional area of the electrically conductive layer to be used, from the set of the lengths of the electrically conductive layer and the insulating layer which has been determined for the desired value of the thermal resistance, selecting an area determined by the selected lengths of the electrically conductive layer and the insulating layer at the minimal value, and selecting the surface region for arranging the heat sink thereon to an area in a range between the maximum value and the minimal value, on a rear face of the wiring portion; and a heat sink provided on the surface region for arranging the heat sink thereon.

In certain embodiments, determining the set of the cross-sectional area and the length of the electrically conductive layer includes determining a resistance value of the electrically conductive layer from the specified value of the voltage drop and a value of an electric current flowing in the electrically conductive layer, and determining a set of the cross-sectional area and the length of the electrically conductive layer to match the determined resistance value.

In certain embodiments, determining the set of the lengths of the electrically conductive layer and the insulating layer includes determining a value of effective thermal conductivity of the wiring portion from a composition ratio between the electrically conductive layer and the insulating layer, determining a value of thermal resistance associated with the electrically conductive layer and the insulating layer with the use of the determined value of the effective thermal conductivity, and determining a set of the lengths of the electrically conductive layer and the insulating layer, such that the determined value of the thermal resistance becomes the desired value of the thermal resistance.

In certain embodiments, a second heat sink is provided on the flip chip.

In certain embodiments, a printed wiring board having an opening is provided at a position corresponding to the surface region for arranging the heat sink thereon is connected to the rear face of the wiring portion by soldering.

In certain embodiments, the printed wiring board is connected to the rear face of the wiring portion through a thermal conductive sheet by solder.

In certain embodiments, a recess is provided on the rear face of the wiring portion, and the bottom face of the recess becomes the surface region for arranging the heat sink thereon.

In certain embodiments, an interposer to be connected to the chip is provided on a surface of the wiring portion, the interposer having an electrically conductive through-via within a range having a size of a plane of a chip.

According to particular embodiments of the present disclosure, a chip mounting technology is realized, through the configuration of wiring layers and insulating layers, which can result in both voltage drop and thermal characteristics within specified limits.

According to certain embodiments, such a chip mounting technology is achieved through a method for selecting the surface region, on the rear face of the wiring portion of the chip-supporting substrate, for arranging a heat sink thereon. The chip mounting technology can also include a chip-supporting substrate on which the surface region for arranging the heat sink thereon is selected, and a chip mounting structure that mounts the chip on the chip-supporting substrate.

Figure 2:
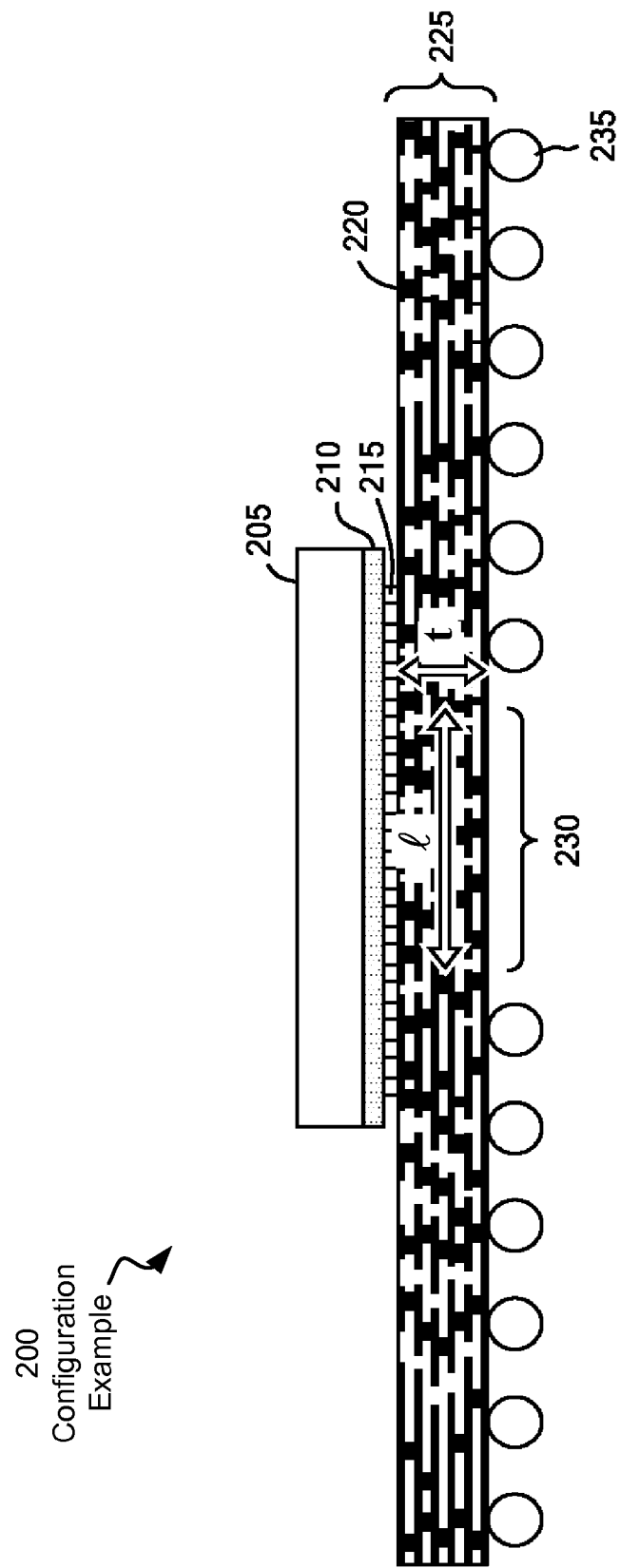
FIG. 2 is a cross-sectional drawing depicting a configuration of a chip-supporting substrate having a rear face of a wiring portion on which a surface region for arranging a heat sink thereon is selected, according to embodiments consistent with the figures.

Certain embodiments relate to determination of the area of a placement region of a heat sink or other heat removal device from the rear face of a chip-supporting substrate for a chip. FIG. 2 is a cross-sectional drawing depicting a configuration example 200 of a chip-supporting substrate 220 in which a surface region 230 for arranging a heat sink thereon is set on the rear face of a wiring portion 225, according to embodiments consistent with the figures. The surface region 230 is selected on the basis of electric characteristics and thermal characteristics to which a length "l" and a thickness "t" in the wiring portion 225 relate, which will be described later. The area of the surface region 230 is determined as l×l, by the length "l". Chip 205 can be a flip chip having a multilayer wiring layer 210 formed on its surface, which is connected to the chip-supporting substrate 220 by a connecting member 215 with face down bonding. In the rear face of the chip-supporting substrate 220, connecting members 235 such as solder bumps are provided on portions except for the surface region 230.

FIG. 3 is a flow diagram of a method 300 for selecting a surface region 230 for arranging a heat sink thereon on the rear face of a wiring portion 225 of a chip-supporting substrate 220, according to embodiments. Firstly, in operation 310, a set of a cross-sectional area and a length of an electrically conductive layer can be determined from a specified value of a voltage drop associated with the electrically conductive layer of the wiring portion 225 to satisfy the specified value of the voltage drop. A cross-sectional area of the electrically conductive layer relates to a thickness "t" in the wiring portion 225, and a length of the electrically conductive layer relates to a length "l" in the wiring portion 225. A set of the cross-sectional area and the length of the electrically conductive layer to satisfy the specified value of the voltage drop can be determined, for instance, according to operations 311 and 312 (FIG. 4).

Figure 4:
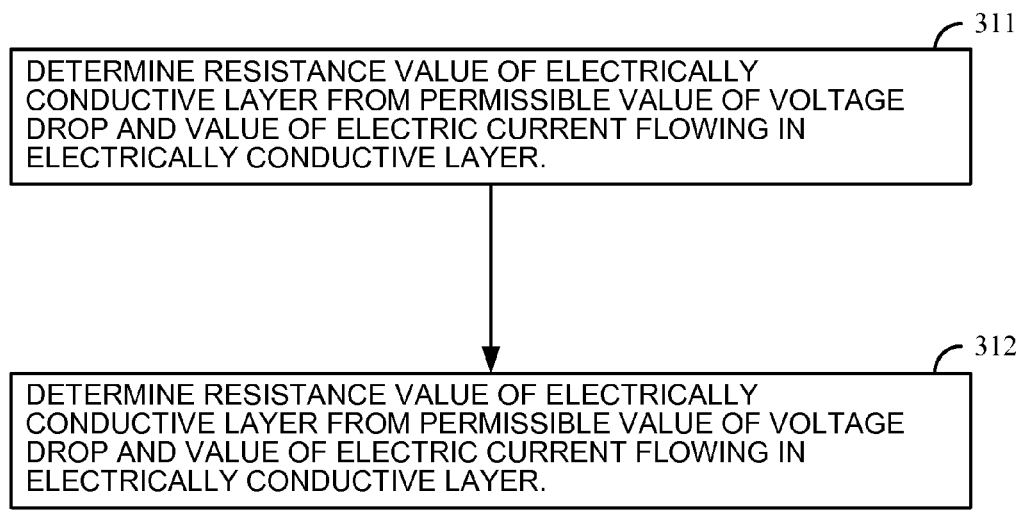
FIG. 4 is a flow diagram illustrating steps within operation 310 (FIG. 3).

FIG. 4 is a flow diagram illustrating steps within operation 310 (FIG. 3), according to embodiments consistent with the figures. In operation 311 (FIG. 4), a resistance value of the electrically conductive layer can be determined from the specified value of the voltage drop and the value of an electric current flowing in the electrically conductive layer. For example, if the specified (maximum) value of the voltage (IR) drop is 100 mV when the electric current flowing in the electrically conductive layer is 100 mA, a permitted resistance value of the electrically conductive layer can be 1Ω, and the resistance value of the electrically conductive layer is determined to be 1 Ω.

In operation 312, a set of a cross-sectional area and a length of the electrically conductive layer is determined to match the determined resistance value. In the case where the electrically conductive layer is Cu wiring, for instance, a resistance value when the cross-sectional area and the length of the Cu wiring have been changed is expressed by the following expression:

$$1.68e{-}8 \times \text{length of Cu wiring/cross-sectional area of Cu wiring}$$

Figure 6:
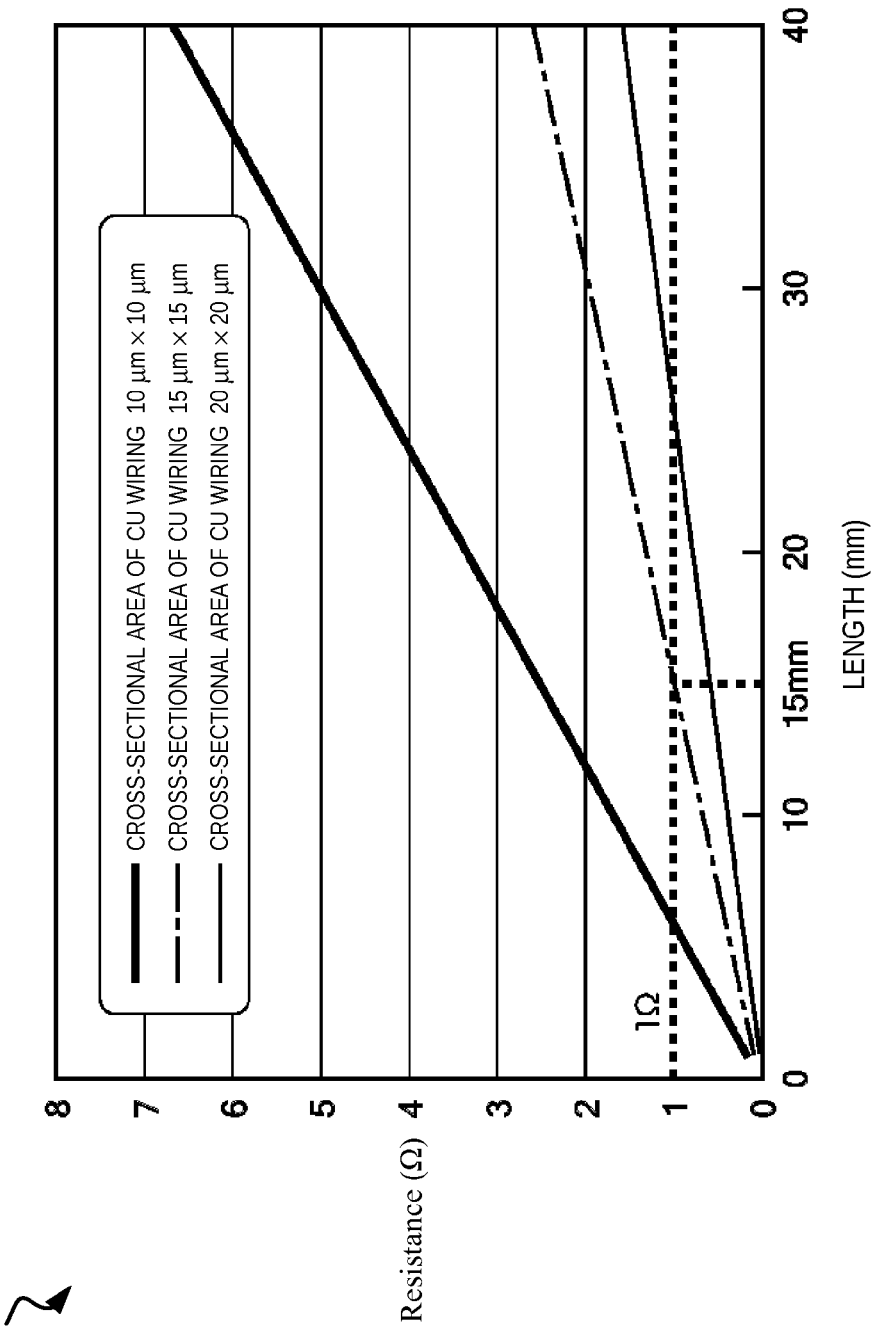
FIG. 6 is a graph illustrating electrical resistance of Cu wiring that has a range of lengths and one of three possible cross-sectional areas, according to embodiments consistent with the figures.

In order to facilitate understanding, suppose that the wiring portion 225 is simply formed of one layer, for instance, a thickness of the Cu wiring is a half of the thickness "t" in the wiring portion 225, and a remaining half thereof is a thickness of the insulating layer. From the above equation, electrical resistances in the cases where the cross-sectional areas of the Cu wiring are 10 μm×10 μm, 15 μm×15 μm and 20 μm×20 μm have been calculated and determined, respectively. Relationships between the electrical resistance and the length of those cases are illustrated by a graph in FIG. 6. It is understood from the graph in FIG. 6 that as the cross-sectional area of the Cu wiring increases, the electrical resistance may decrease. The determined specified resistance value is 1Ω, and accordingly, from the graph in FIG. 6, sets of the cross-sectional area and the length of the Cu wiring are determined, such that the values of the electrical resistance become 1Ω or less. For example, when the cross-sectional area of the Cu wiring is 15 μm×15 μm, the length of Cu wiring is permitted up to 15 mm. Accordingly, the length l in the wiring portion 225 is also permitted up to 15 mm, and the set of the cross-sectional area of 15 μm×15 μm and the length of 15 mm is determined.

In a flow 300 of operation in FIG. 3, next, in operation 320, a set of lengths of the electrically conductive layer and an insulating layer can be determined from a desired value of thermal resistance associated with the electrically conductive layer and the insulating layer of the wiring portion 225, such that the electrically conductive layer and the insulating layer when having been selected so as to have the cross-sectional area out of the set of the cross-sectional area and the length of the electrically conductive layer that has been determined for the specified value of the voltage drop satisfy the desired value of the thermal resistance. Such a set of the lengths of the electrically conductive layer and the insulating layer as to satisfy the desired value of the thermal resistance can be determined, for instance, by operations 321, 322 and 323 (FIG. 5).

Figure 5:
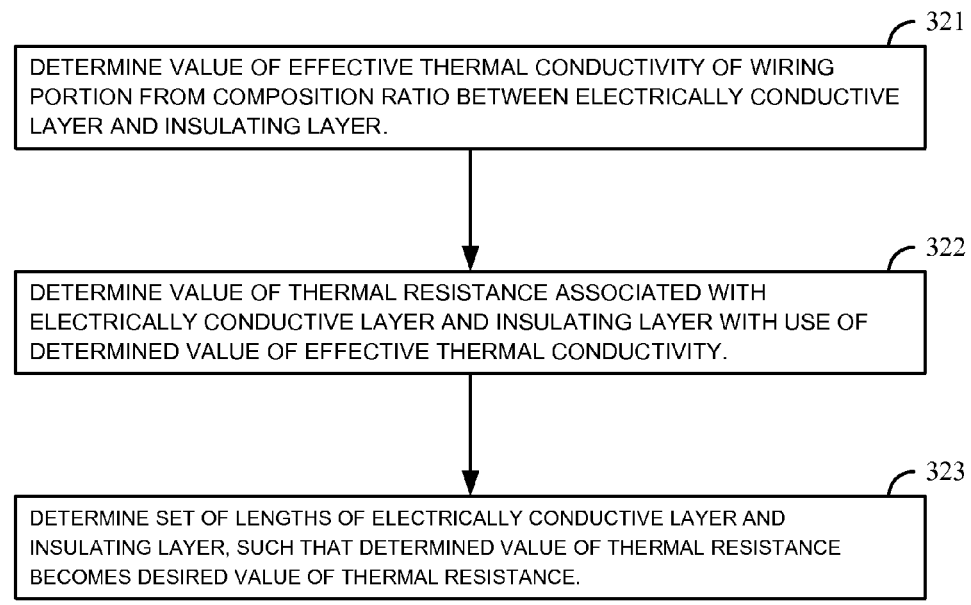
FIG. 5 is a flow diagram of a method illustrating steps within operation 320 (FIG. 3).

FIG. 5 is a flow diagram illustrating steps within operation 320 (FIG. 3), according to embodiments consistent with the figures. In operation 321 (FIG. 5), a value of effective thermal conductivity of the wiring portion 225 is determined from a composition ratio between the electrically conductive layer and the insulating layer. For instance, suppose that the wiring portion 225 is simply formed of one layer, a thickness of the Cu wiring is a half of the thickness "t" in the wiring portion 225, and a remaining half thereof is a thickness of the insulating layer, similarly to the previous description, and that each component ratio between the Cu wiring and the insulating layer is 50%, and heat conducts through a region l×l having a depth "l" equal to the length l in the wiring portion 225. When the value of effective thermal conductivity of the wiring portion 225 is determined, 1.98 W/mK is derived.

In operation 322 (FIG. 5), a value of thermal resistance associated with the electrically conductive layer and the insulating layer is determined with the use of the determined value of effective thermal conductivity of the wiring portion 225. The value of the thermal resistance associated with the electrically conductive layer and the insulating layer of the wiring portion 225 is expressed by an expression with the use of the value of effective thermal conductivity, and can be calculated with the use of the expression. When the above described value of effective thermal conductivity of 1.98 W/mK is used, for instance, the value of the thermal resistance can be expressed by the following equation:

$$\text{Thermal resistance} = \text{Thickness } t/(1.98 \times \text{length } l \times \text{length } l)$$

Figure 7:
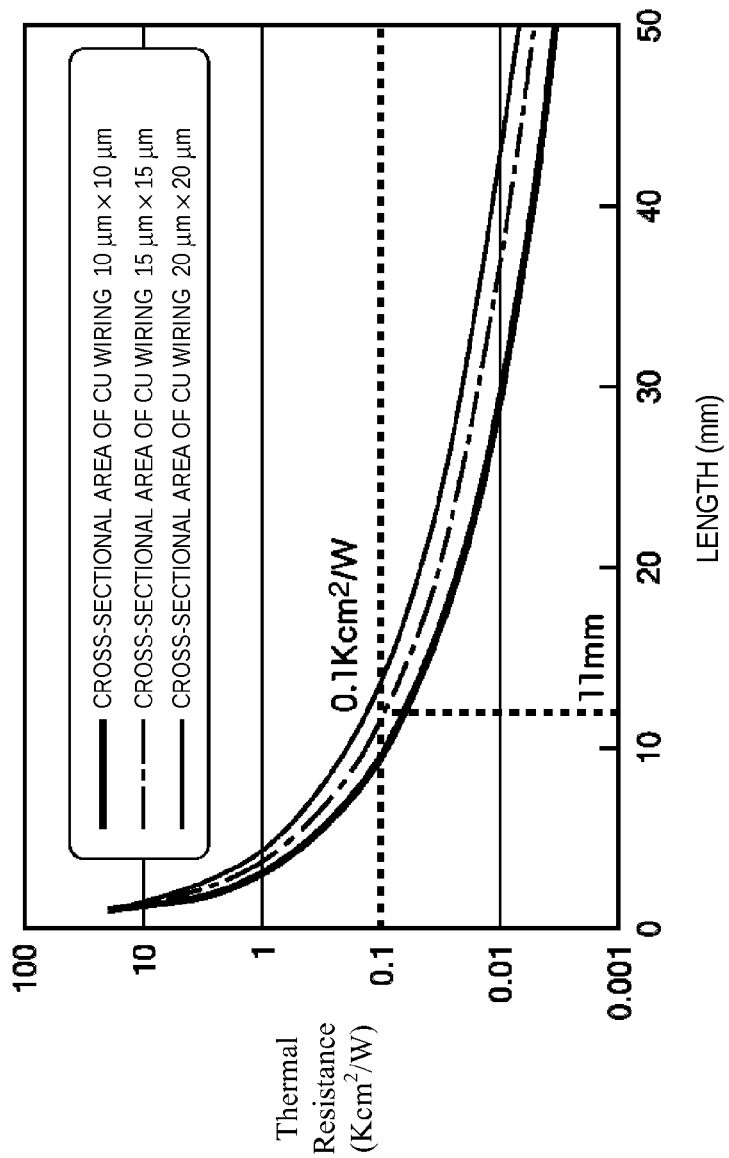
FIG. 7 is a graph illustrating thermal resistance of Cu wiring that has a range of lengths and one of three possible cross-sectional areas, according to embodiments consistent with the figures.

According to this equation, the thermal resistances have been calculated and determined in the cases where the cross-sectional areas of the Cu wiring are 10 μm×10 μm, 15 μm×15 μm and 20 μm×20 μm, respectively. Relationships between the thermal resistance and the length of those cases are illustrated by a graph in FIG. 7. It may be understood from the graph in FIG. 7 that as the cross-sectional area of the Cu wiring increases, the thermal resistance increases.

In operation 323 (FIG. 5), a set of the lengths of the electrically conductive layer and the insulating layer is determined, such that the determined value of thermal resistance becomes a desired value of the thermal resistance. The value of thermal resistance is desirably an approximately equal value of thermal resistance to that of a heat conducting substance Thermal Interface Material (TIM) such as a heat conducting grease which is generally used in a chip mounting technology. For instance, the value of the thermal resistance is 0.1 Kcm²/W, and accordingly the value can be used as the desired value of the thermal resistance. If the desired value of the thermal resistance is set at 0.1 Kcm²/W, such a set of the lengths of the Cu wiring and the insulating layer is determined from the graph in FIG. 7 that the value of the thermal resistance is 0.1 Kcm²/W or less. When the cross-sectional area of the Cu wiring is set at 15 μm×15 μm, for instance, the lengths of the Cu wiring and the insulating layer are desired to be 11 mm or more. Accordingly, the length l in the wiring portion 225 is also desired to be 11 mm or more, and the set of the lengths of the Cu wiring and the insulating layer when the cross-sectional area is 15 μm×15 μm is determined.

In a flow 300 of operation in FIG. 3, further in operation 330, the surface region for arranging the heat sink thereon is selected in the following way. Specifically, a length of an electrically conductive layer corresponding to the cross-sectional area of the electrically conductive layer to be used is selected from the set of the cross-sectional area and the length of the electrically conductive layer, which has been determined for the specified value of the voltage drop in the operation 310, and an area determined by the selected length of the electrically conductive layer is set at an upper size (e.g., the "maximum value"). For instance, as for the set of the cross-sectional area and the length of the Cu wiring, which has been determined for the specified value of the voltage drop of 100 mV illustrated in FIG. 6, if the cross-sectional area of the Cu wiring to be used is 15 μm×15 μm, the length of 15 mm of the Cu wiring is selected, and the area of 15 mm×15 mm determined by the selected length of 15 mm of the Cu wiring is set at the maximum value. In addition, the lengths of the electrically conductive layer corresponding to the cross-sectional area of the electrically conductive layer to be used and the insulating layer are selected from the set of the lengths of the electrically conductive layer and the insulating layer which has been determined for the desired value of the thermal resistance in the operation 320, and an area determined by the selected lengths of the electrically conductive layer and the insulating layer is set at the minimal value. For instance, as for the set of lengths of the Cu wiring and the insulating layer, which has been determined for the desired value of the thermal resistance of 0.1 Kcm²/W illustrated in FIG. 7, the cross-sectional area of the Cu wiring to be used is 15 μm×15 μm, and accordingly the lengths of 11 mm or more of the Cu wiring and the insulating layer are selected. Then, a lower size for an area (or minimal size/value) is set at 11 mm×11 mm, which is determined by the selected lengths of 11 mm or more of the Cu wiring and the insulating layer. Then, the surface region for arranging the heat sink thereon is set at an area in a range between the maximum value and a minimum value. In an example which uses the cross-sectional area of the Cu wiring of 15 μm×15 μm illustrated in FIG. 6 and FIG. 7, the surface region 230 for arranging the heat sink thereon is set on the rear face of the wiring portion 225 of the chip-supporting substrate 220, so as to have an area in a range of 11 mm×11 mm or more and 15 mm×15 mm or less. The chip-supporting substrate 220 on which the surface region 230 for arranging the heat sink thereon has been thus set on the rear face of the wiring portion 225 is excellent in the electric characteristics of the voltage drop and also is excellent in the thermal characteristics of the heat radiation.

Figure 8:
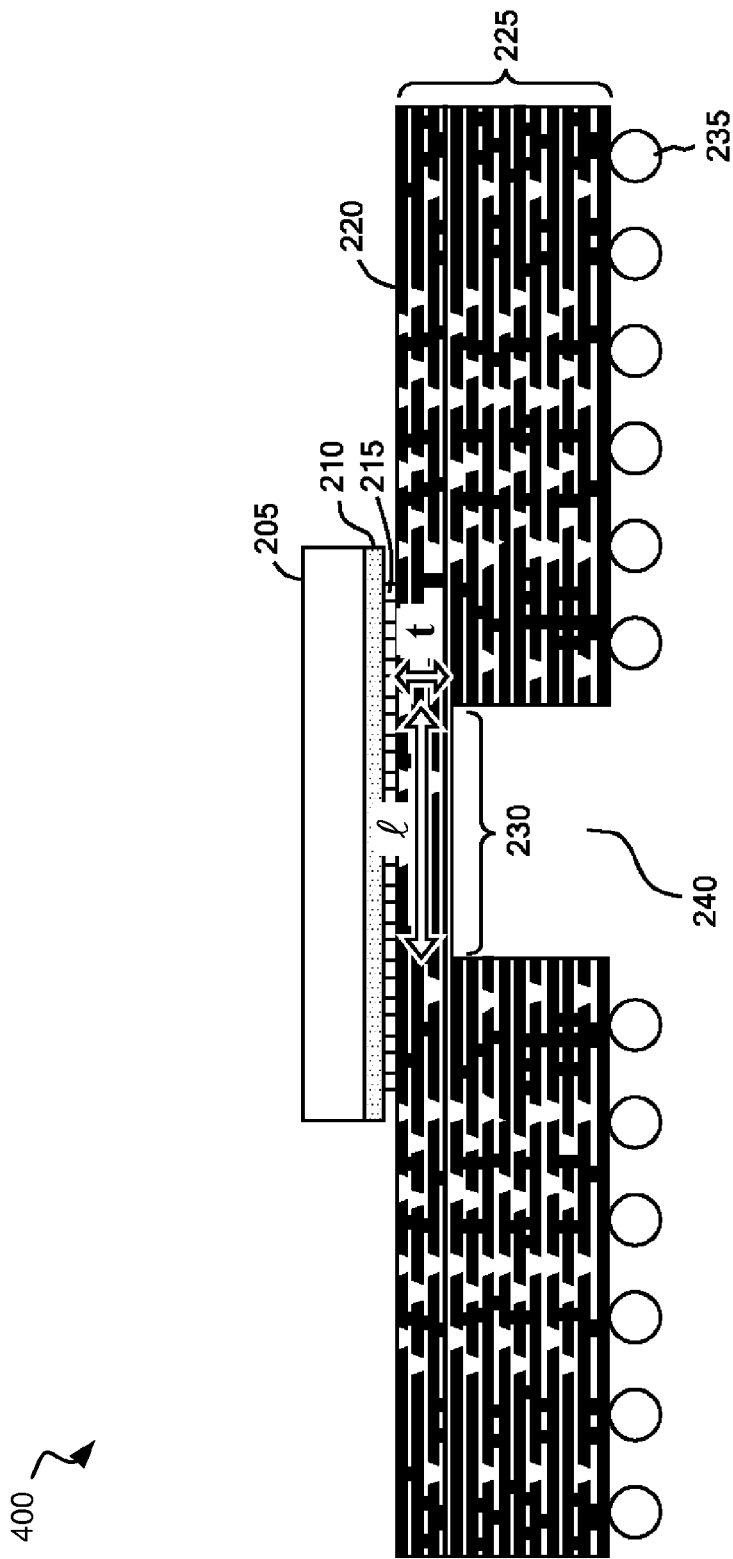
FIG. 8 is a cross-sectional drawing depicting a configuration of a chip-supporting substrate in which a recess is provided on the rear face of the wiring portion, and the surface region for arranging the heat sink thereon is selected, according to embodiments consistent with the figures.

In the configuration example 200 of the chip-supporting substrate 220 illustrated in FIG. 2, the surface region 230 for arranging the heat sink thereon is set on the rear face of the wiring portion 225, but a configuration example 400 of a chip-supporting substrate 220 schematically illustrated in FIG. 8 by a sectional view has a recess 240 provided on the rear face of the wiring portion 225 and has the surface region 230 for arranging a heat sink thereon set on the bottom face of the recess 240. In the configuration example 400 as well similarly to the configuration example 200, the surface region 230 is selected on the basis of the electric characteristics and the thermal characteristics to which the length l and the thickness t of the wiring portion 225 relate. The area of the surface region 230 is determined to be l×l, by the length "l". Even though the whole thickness of the wiring portion 225 becomes thick, the surface region 230 keeps the thickness t in the wiring portion 225, and accordingly the thermal characteristics of the heat radiation in the configuration example 400 are excellent. When the thickness of the wiring portion 225 becomes thick, the wiring portion 225 not only can cope with multilayering of the wiring, but also can increase the thicknesses of the wiring layer and the insulating layer.

Figure 9:
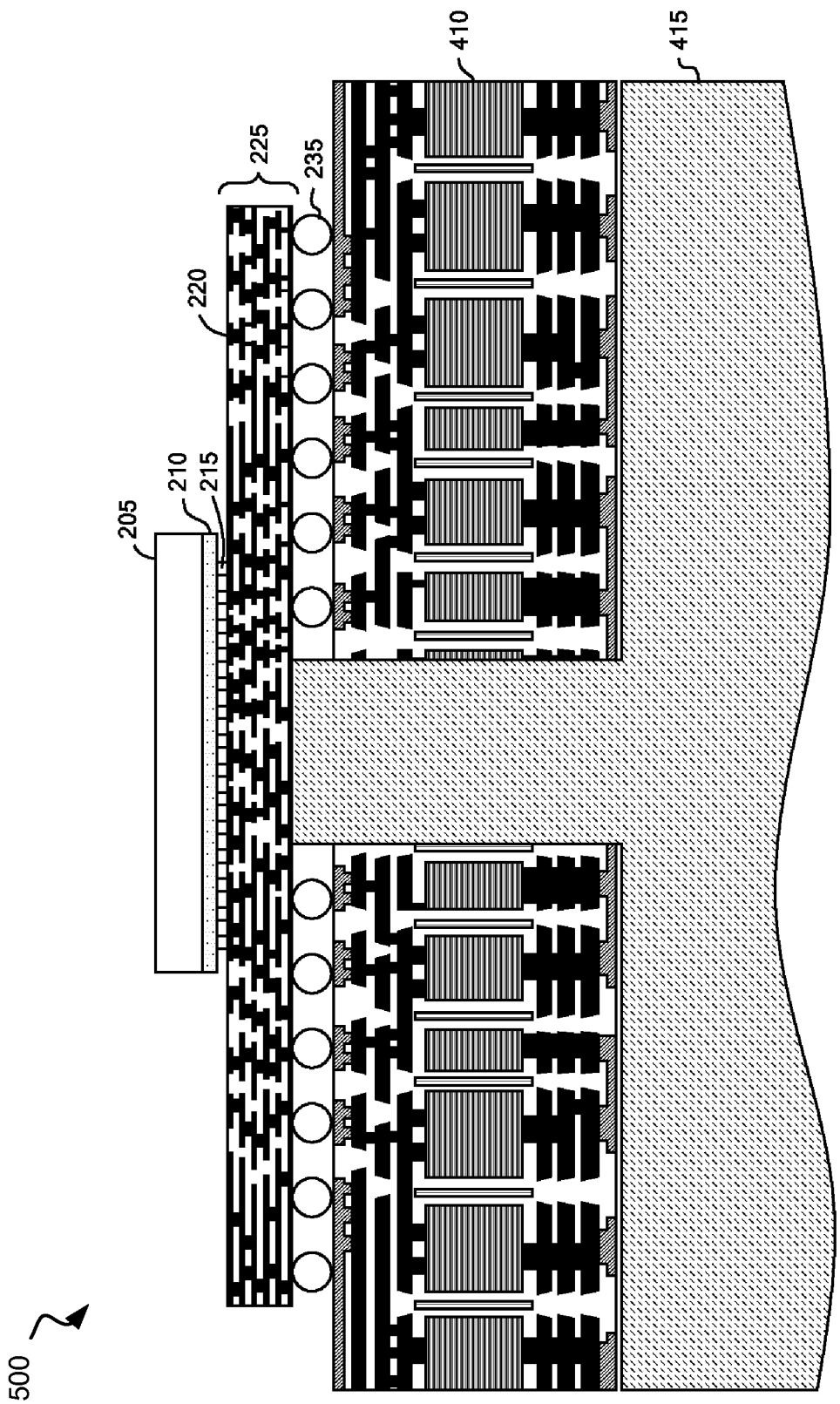
FIG. 9 is a cross-sectional drawing depicting a chip mounting structure that uses the chip-supporting substrate in which the surface region for arranging the heat sink thereon is selected on the rear face of the wiring portion, according to embodiments consistent with the figures.

FIG. 9 is a cross-sectional drawing depicting a chip mounting structure 500 which uses the configuration example 200 of the chip-supporting substrate 220 (FIG. 2). In the chip mounting structure 500, the chip-supporting substrate 220 in the configuration example 200 is connected to a printed wiring board 410 provided with a multilayered wiring layer, by a connecting member 235 provided on the rear face of the wiring portion 225. The printed wiring board 410 can be used, for instance, as a mother board. The printed wiring board 410 has an opening provided at a position corresponding to the surface region for arranging a heat sink thereon set on the rear face of the wiring portion 225. A projecting portion of a heat sink 415 is inserted into the opening, and comes in contact with the surface region for arranging the heat sink thereon.

Figure 10:
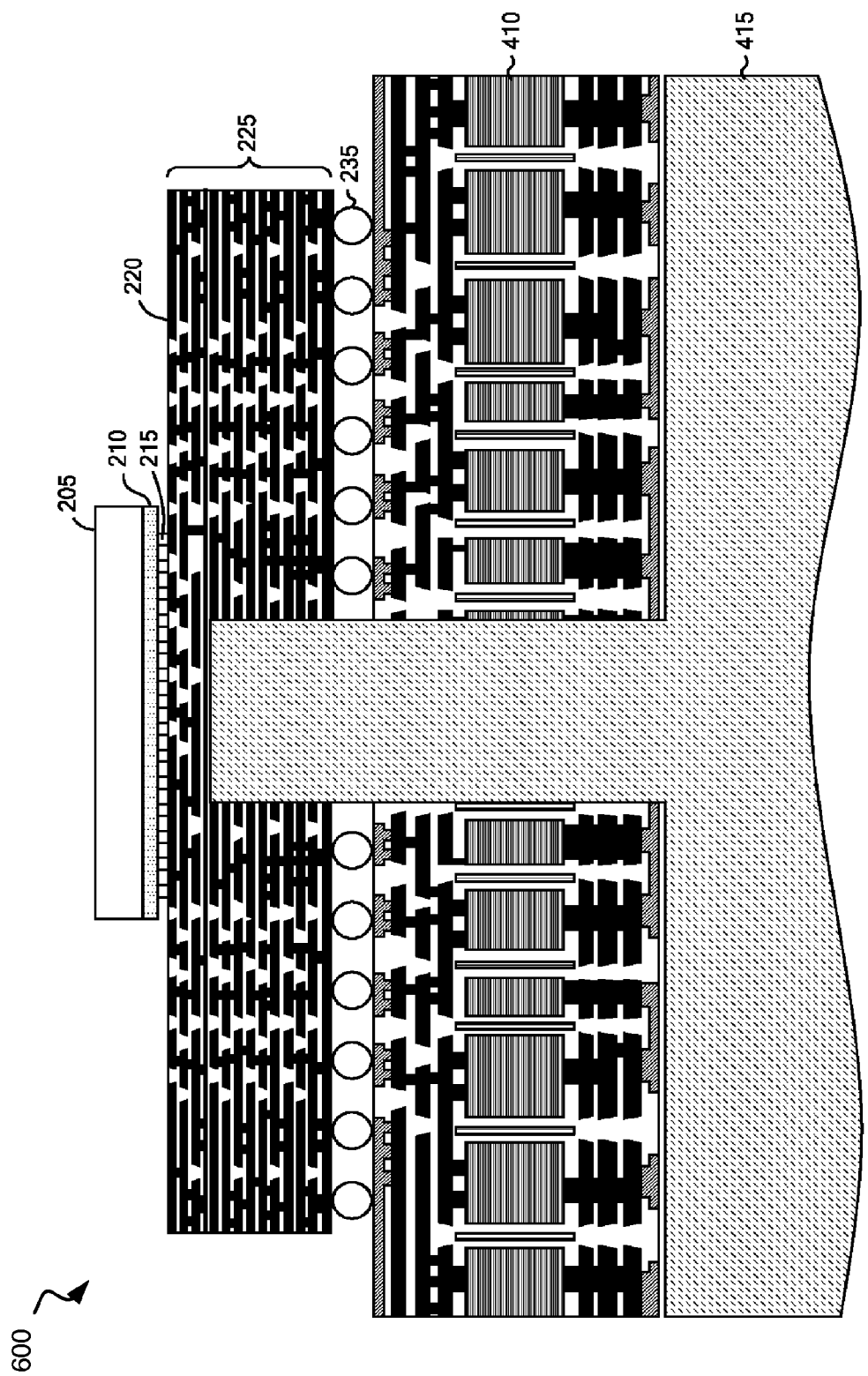
FIG. 10 is a cross-sectional drawing depicting a chip mounting structure that uses the chip-supporting substrate in which the recess is provided on the rear face of the wiring portion and the surface region for arranging the heat sink thereon is set, according to embodiments consistent with the figures.

FIG. 10 is a cross-sectional drawing depicting a chip mounting structure 600 which uses the configuration example 400 of the chip-supporting substrate 220 (FIG. 8). In the chip mounting structure 600 as well, the chip-supporting substrate 220 in the configuration example 400 is connected to the printed wiring board 410 provided with a multilayered wiring layer, by the connecting member 235 provided on the rear face of the wiring portion 225. Similarly to the chip mounting structure 500 in FIG. 9, the projecting portion of the heat sink 415 is inserted into the opening of the printed wiring board 410, and comes in contact with the surface region for arranging a heat sink thereon, which is provided on the rear face of the wiring portion 225 and forms the bottom face of the recess.

Figure 11:
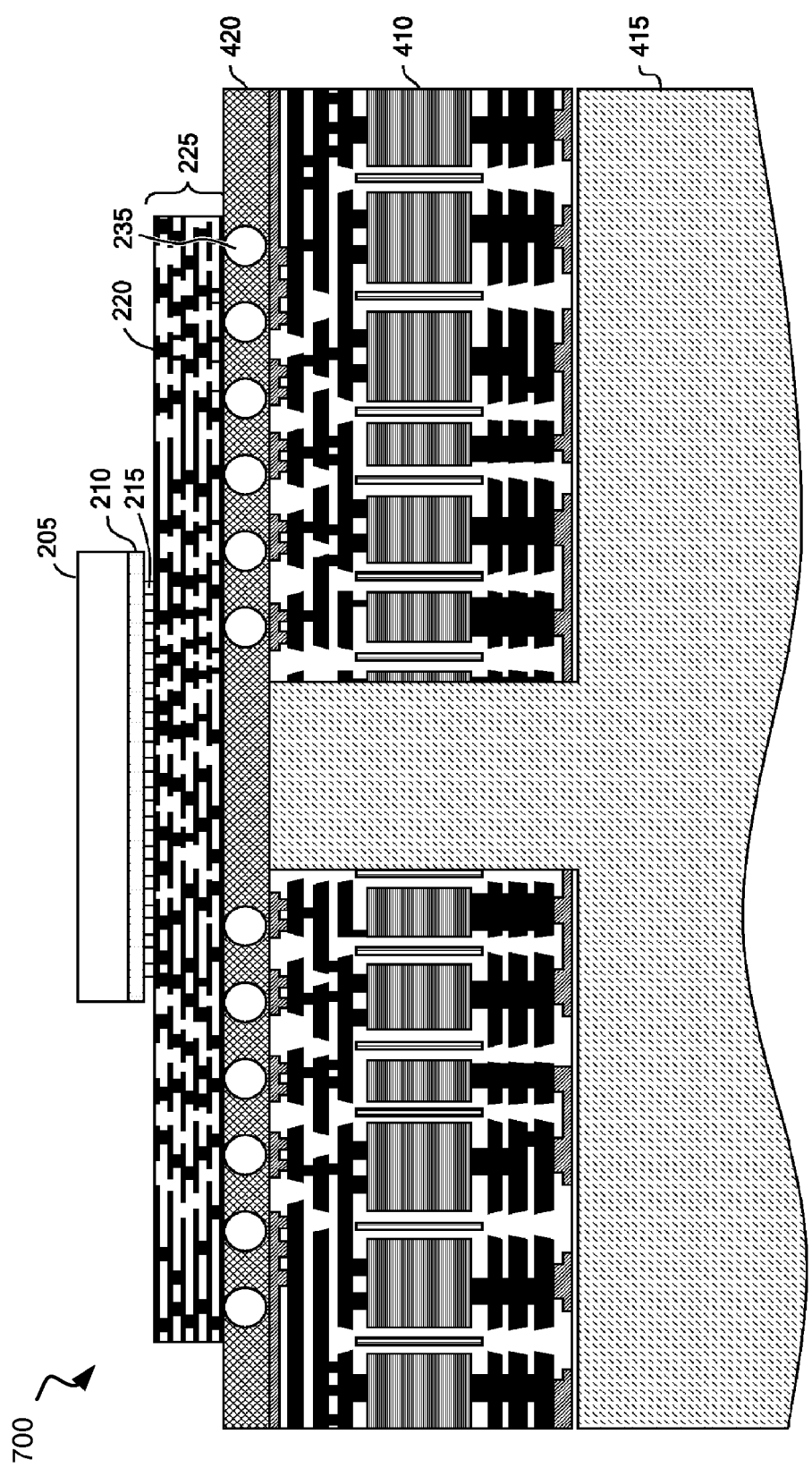
FIG. 11 is a cross-sectional drawing depicting a chip mounting structure that uses, in conjunction with a thermally conductive sheet, the chip-supporting substrate in which the surface region for arranging the heat sink thereon is selected on the rear face of the wiring portion, according to embodiments consistent with the figures.

In FIG. 11 is a cross-sectional drawing depicting a chip mounting structure 700 which uses the configuration example 200 of the chip-supporting substrate 220 (FIG. 2). In the chip mounting structure 700, the printed wiring board 410 is connected to the rear face of the chip-supporting substrate 220 through a thermal conductive sheet 420 by solder, which is different from the chip mounting structure 500 in FIG. 9. The thermal conductive sheet 420 is, for instance, a graphite sheet or the like. By the thermal conductive sheet 420 provided on the rear face of the chip-supporting substrate 220, the thermal characteristics of the heat radiation can be further enhanced.

Figure 12:
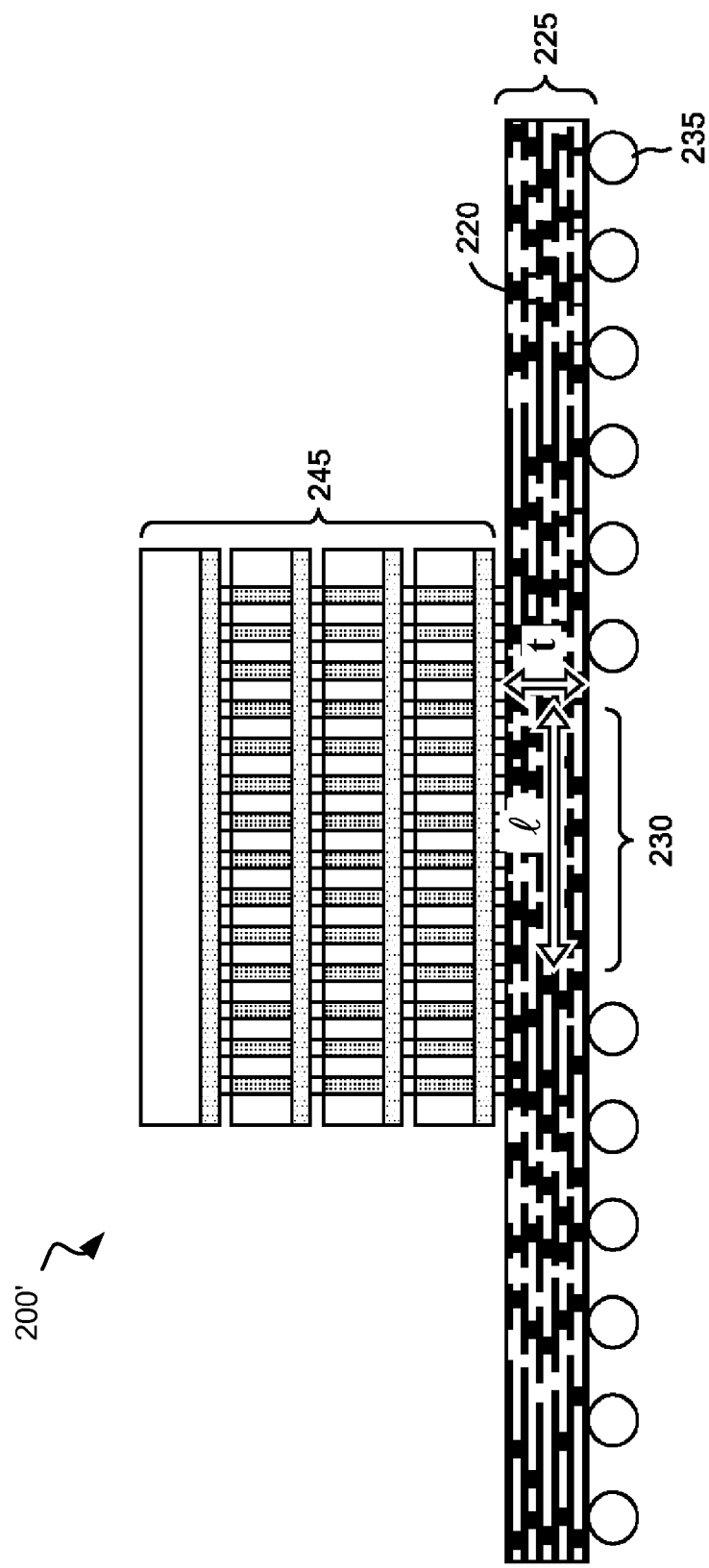
FIG. 12 is a cross-sectional drawing depicting a configuration in which a three-dimensionally stacked chip is mounted on the chip-supporting substrate depicted in FIG. 2, according to embodiments consistent with the figures.
Figure 13:
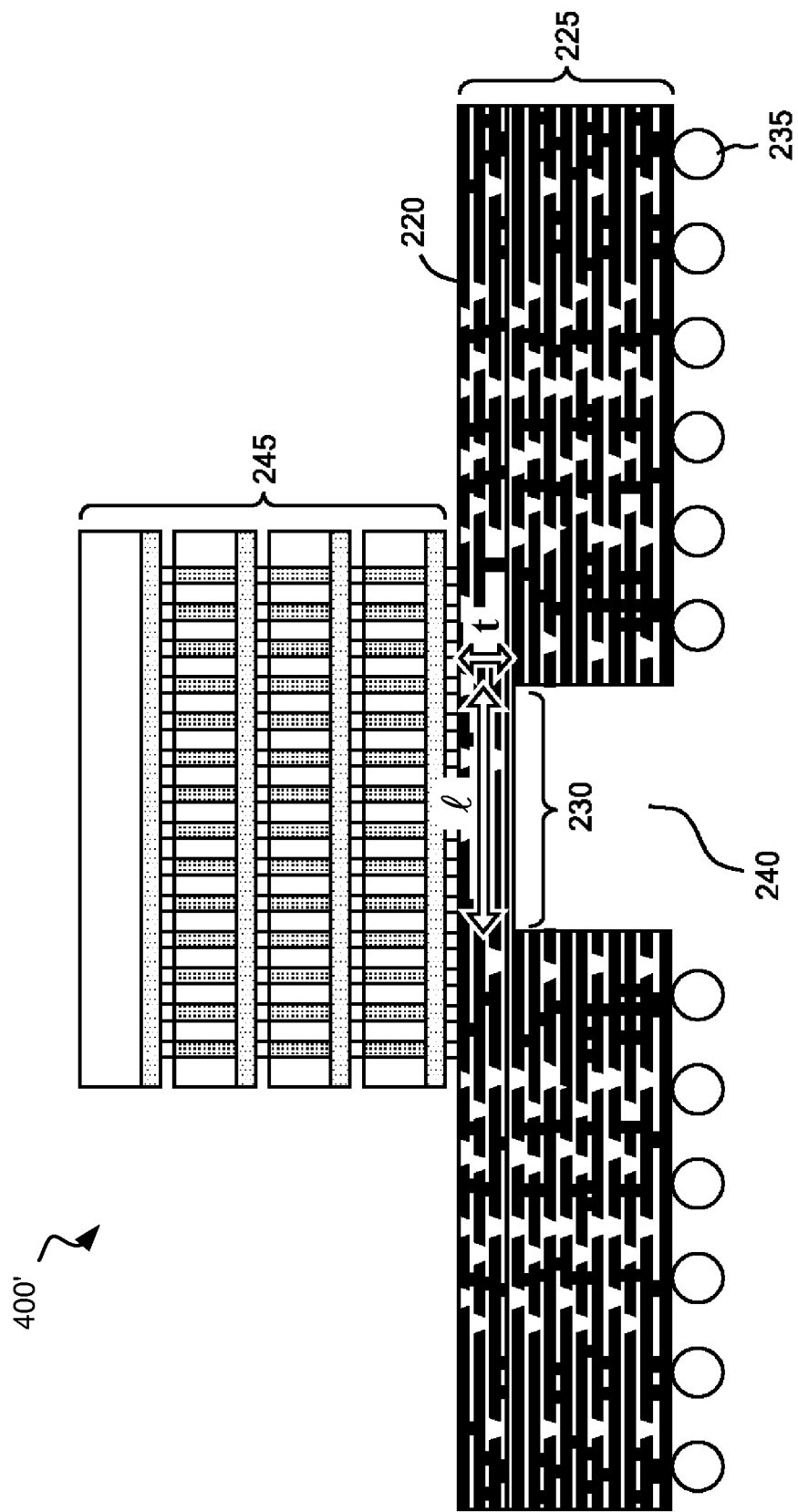
FIG. 13 is a cross-sectional drawing depicting a configuration in which a three-dimensionally stacked chip is mounted on the chip-supporting substrate depicted in FIG. 8, according to embodiments consistent with the figures.

In the configuration example 200 of the chip-supporting substrate 220 illustrated in FIG. 2, one chip 205 is mounted on the surface of the chip-supporting substrate 220, but as in a configuration example 200' illustrated in FIG. 12, a three-dimensionally stacked chip 245 in which a plurality of chips are stacked can be mounted on the surface of the chip-supporting substrate 220. Similarly, in the configuration example 400 of the chip-supporting substrate 220 illustrated in FIG. 8, one chip 205 is mounted on the surface of the chip-supporting substrate 220, but as in a configuration example 400' illustrated in FIG. 13, the three-dimensionally stacked chip 245 can be mounted on the surface of the chip-supporting substrate 220.

Figure 14:
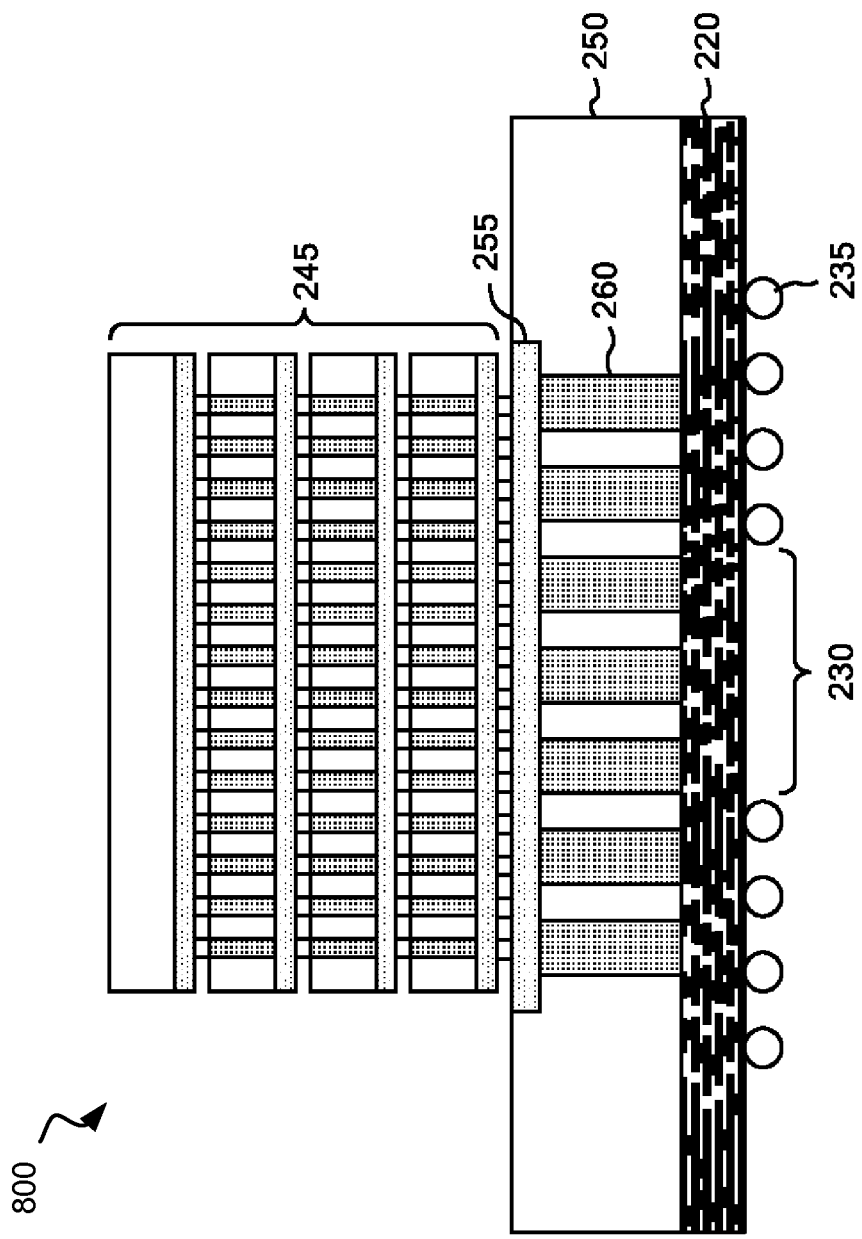
FIG. 14 is a cross-sectional drawing depicting a configuration in which an interposer is provided on the chip-supporting substrate depicted in FIG. 12, according to embodiments consistent with the figures.

In the configuration examples 200 and 200' of the chip-supporting substrate 220 illustrated in FIG. 2 and FIG. 12, the chips 205 and 245 are mounted directly on the surface of the chip-supporting substrate 220, but it is acceptable as in a configuration example 800 illustrated in FIG. 14 to provide an interposer 250 on the surface of the wiring portion in the chip-supporting substrate 220 and mount the chip on the interposer 250. The interposer 250 is formed, for instance, from a material such as silicon which is excellent in thermal conduction, and accordingly does not aggravate the thermal characteristics of the heat radiation. The interposer 250 has wiring 255 formed on its surface with BEOL, and has electrically conductive through-vias 260 provided therein. The electrically conductive through-vias 260 are provided within a range having the size of the plane of the chip in the interposer 250, are not routed up to the outer periphery of the chip, and accordingly do not aggravate the electric characteristics of the voltage drop. Similarly, in the configuration examples 400 and 400' of the chip-supporting substrate 220 illustrated in FIG. 8 and FIG. 13, the chips 205 and 245 are mounted directly on the surface of the chip-supporting substrate 220, but it is acceptable as in a configuration example 900 illustrated in FIG. 15 to provide an interposer 250 on the surface of the wiring portion in the chip-supporting substrate 220 and mount the chip on the interposer 250.

Figure 16:
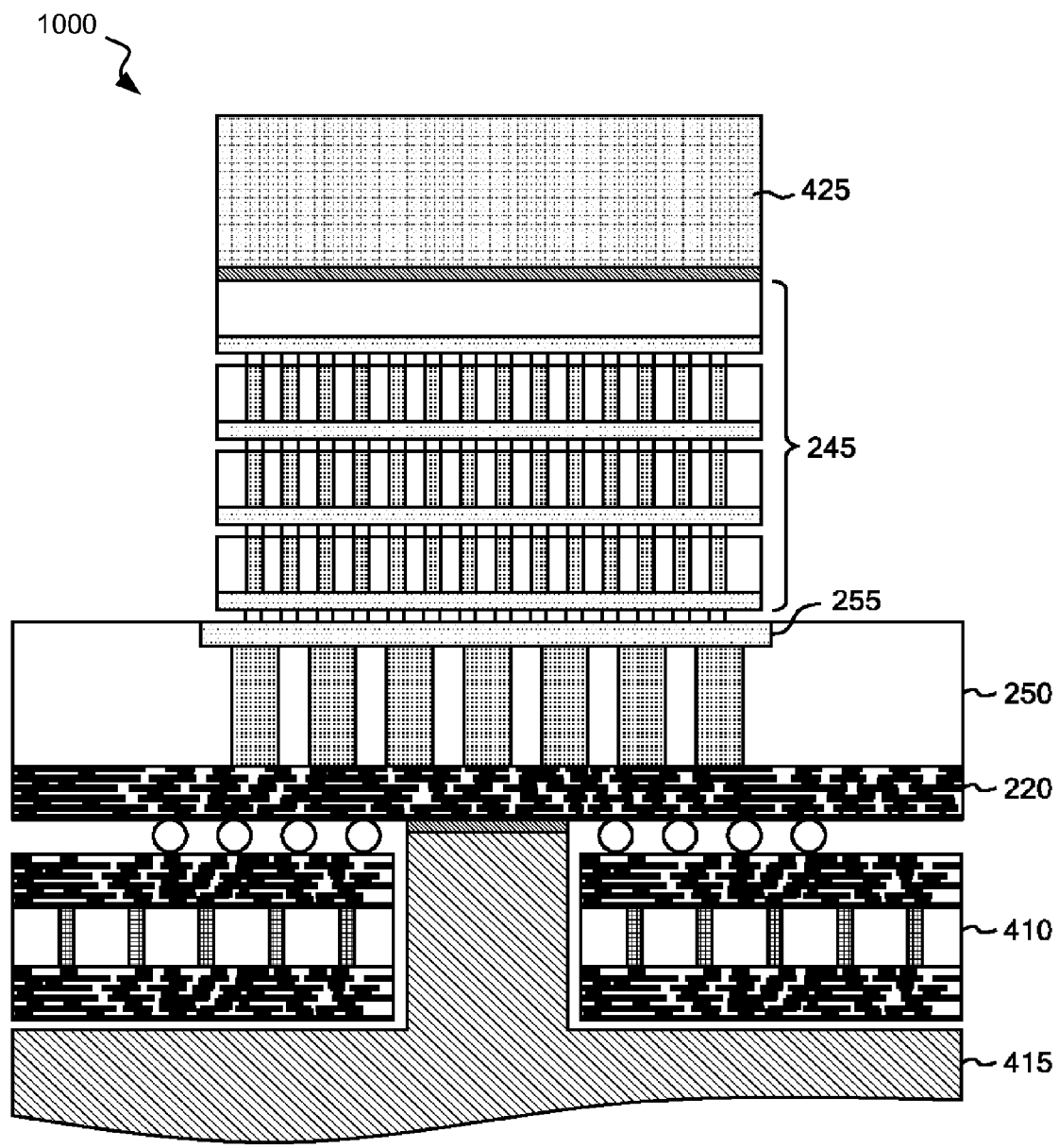
FIG. 16 is a cross-sectional drawing depicting a chip mounting structure in which a second heat sink is provided on the chip while using the configuration of the chip-supporting substrate depicted in FIG. 14, according to embodiments consistent with the figures.

FIG. 16 is a cross-sectional drawing depicting a chip mounting structure 1000 which uses the configuration example 800 of the chip-supporting substrate 220 (FIG. 14). In the chip mounting structure 1000 as well, the chip-supporting substrate 220 in the configuration example 800 is connected to the printed wiring board 410 provided with a multilayered wiring layer. The projecting portion of the heat sink 415 is inserted into the opening of the printed wiring board 410, and comes in contact with the surface region for arranging the heat sink thereon, which is set on the rear face of the wiring portion in the chip-supporting substrate 220. In the chip mounting structure 1000, not only the heat sink 415 is provided on the lower face side of the chip-supporting substrate 220 but also another heat sink 425 is provided on the three-dimensionally stacked chip 245, which enhances the thermal characteristics of the heat radiation.

Figure 15:
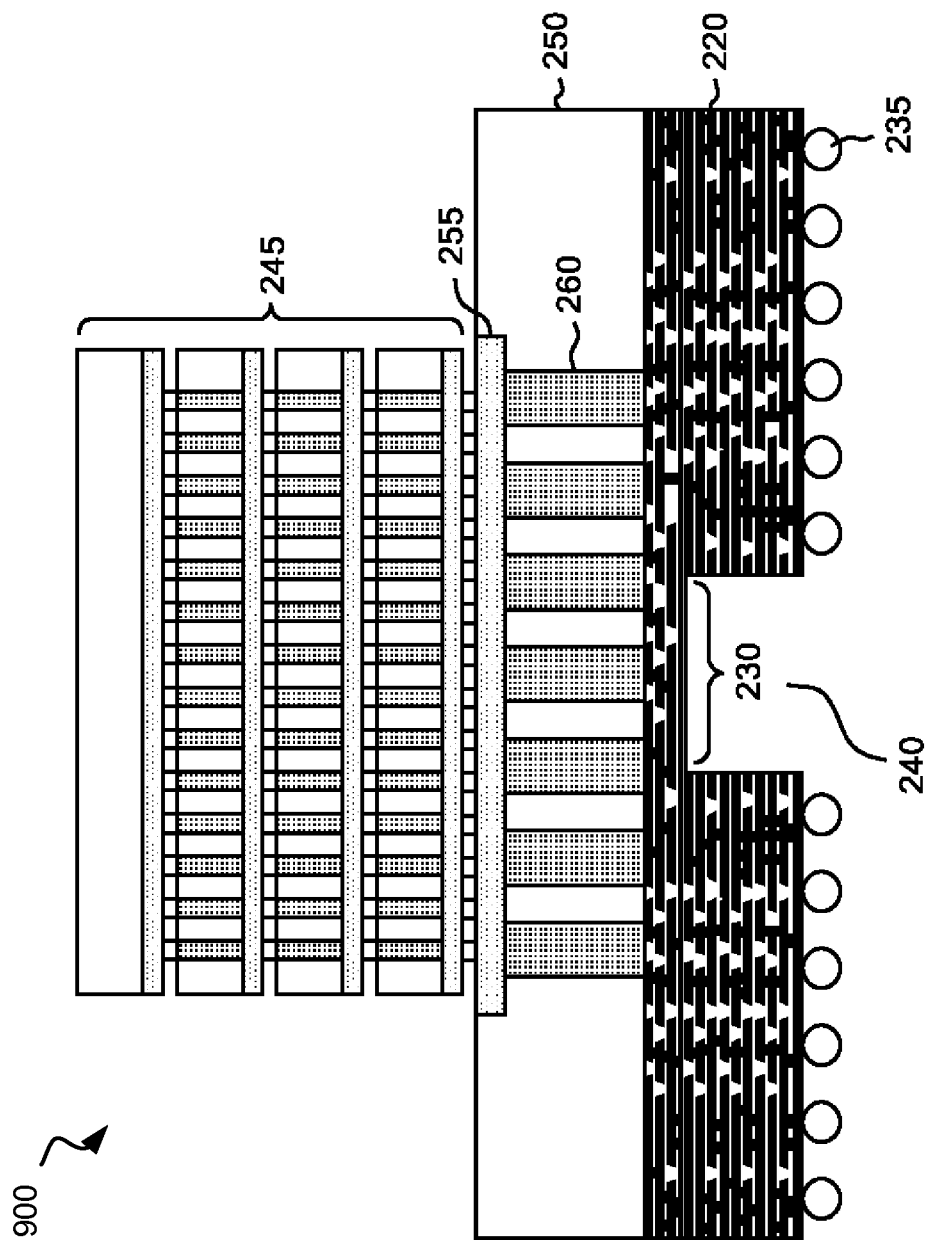
FIG. 15 is a cross-sectional drawing depicting a configuration in which an interposer is provided on the chip-supporting substrate depicted in FIG. 13, according to embodiments consistent with the figures.
Figure 17:
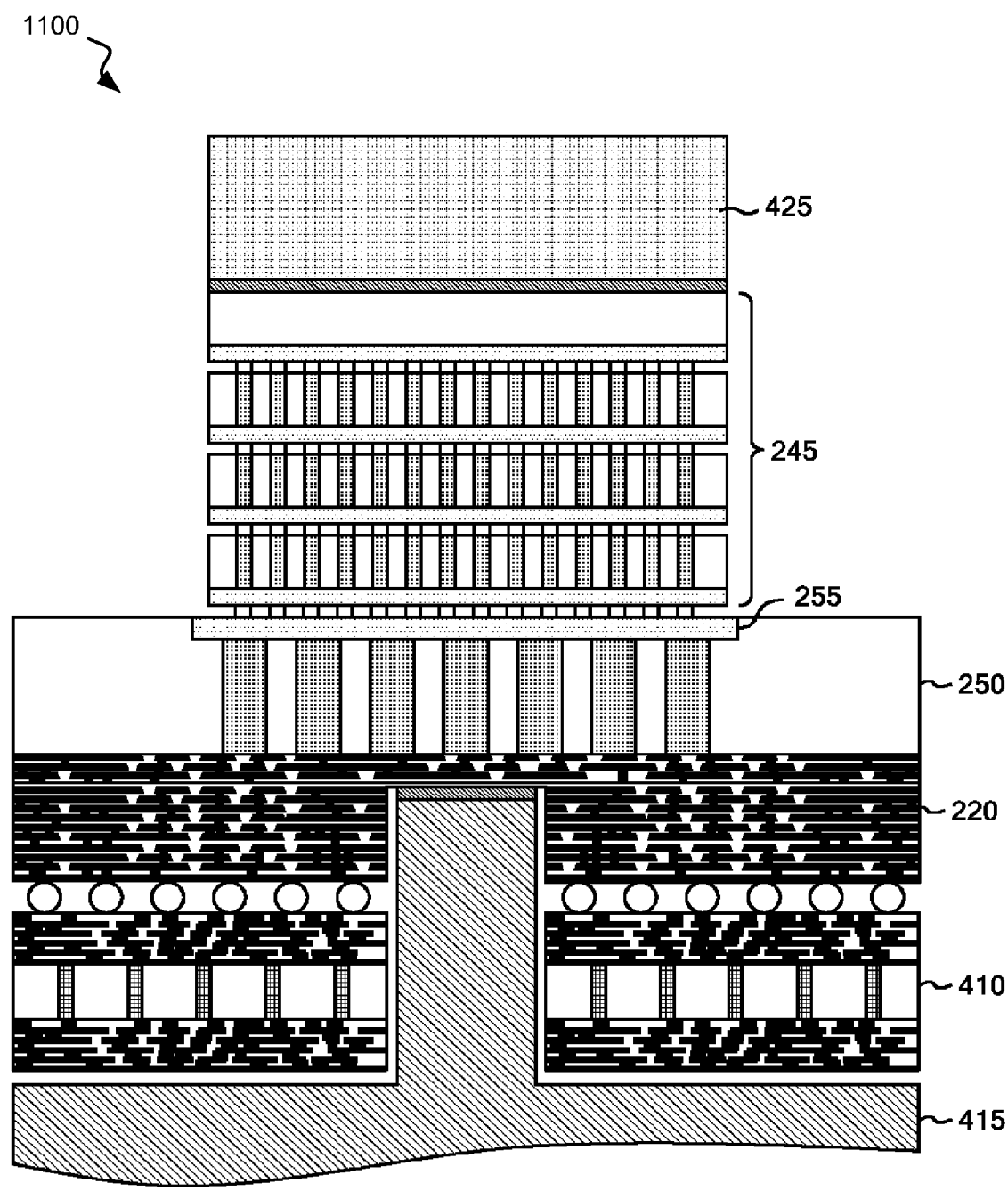
FIG. 17 is a cross-sectional drawing depicting a chip mounting structure in which a second heat sink is provided on the chip while using the configuration of the chip-supporting substrate depicted in FIG. 15, according to embodiments consistent with the figures.

FIG. 17 is a cross-sectional drawing depicting a chip mounting structure 1100 which uses the configuration example 900 of the chip-supporting substrate 220 (FIG. 15). In the chip mounting structure 1100 as well, the chip-supporting substrate 220 in the configuration example 900 is connected to the printed wiring board 410 provided with a multilayered wiring layer. The projecting portion of the heat sink 415 is inserted into the opening of the printed wiring board 410, and comes in contact with the surface region for arranging the heat sink thereon, which is provided on the rear face of the wiring portion in the chip-supporting substrate 220 and forms the bottom face of the recess. In the chip mounting structure 1100 as well, not only the heat sink 415 is provided on the lower face side of the chip-supporting substrate 220 but also another heat sink 425 is provided on the three-dimensionally stacked chip 245, which enhances the thermal characteristics of the heat radiation.

Figure 18:
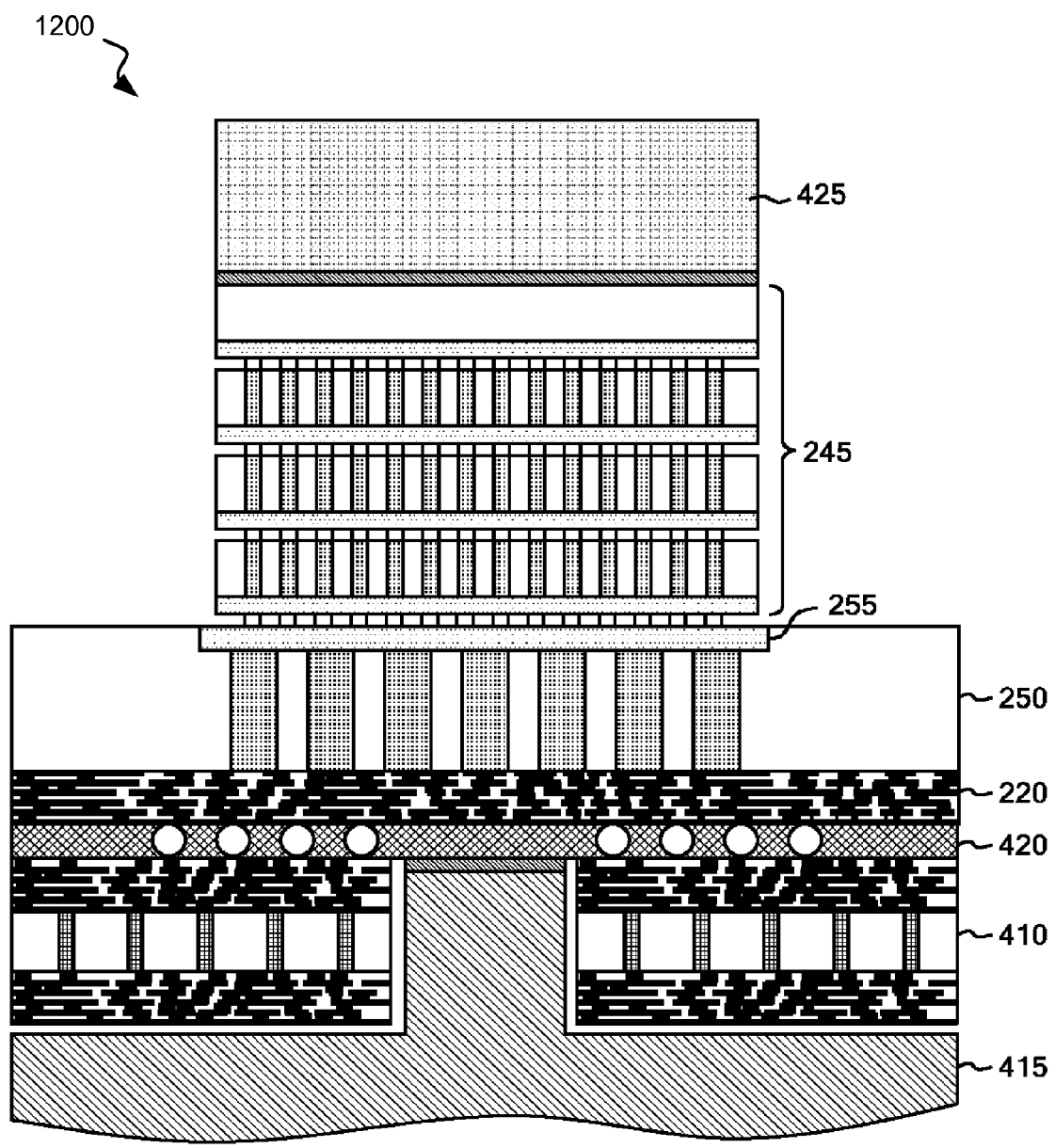
FIG. 18 is a cross-sectional drawing depicting a chip mounting structure in which a thermally conductive sheet is used in conjunction with the chip mounting structure depicted in FIG. 16, according to embodiments consistent with the figures.

In FIG. 18 is a cross-sectional drawing depicting a chip mounting structure 1200 which uses the configuration example 800 of the chip-supporting substrate 220 (FIG. 14). In the chip mounting structure 1200, the printed wiring board 410 is connected to the rear face of the chip-supporting substrate 220 through the thermal conductive sheet 420 by solder, which is different from the chip mounting structure 1000 in FIG. 16. By the thermal conductive sheet 420 provided on the rear face of the chip-supporting substrate 220, the thermal characteristics of the heat radiation can be further enhanced.

Figure 19:
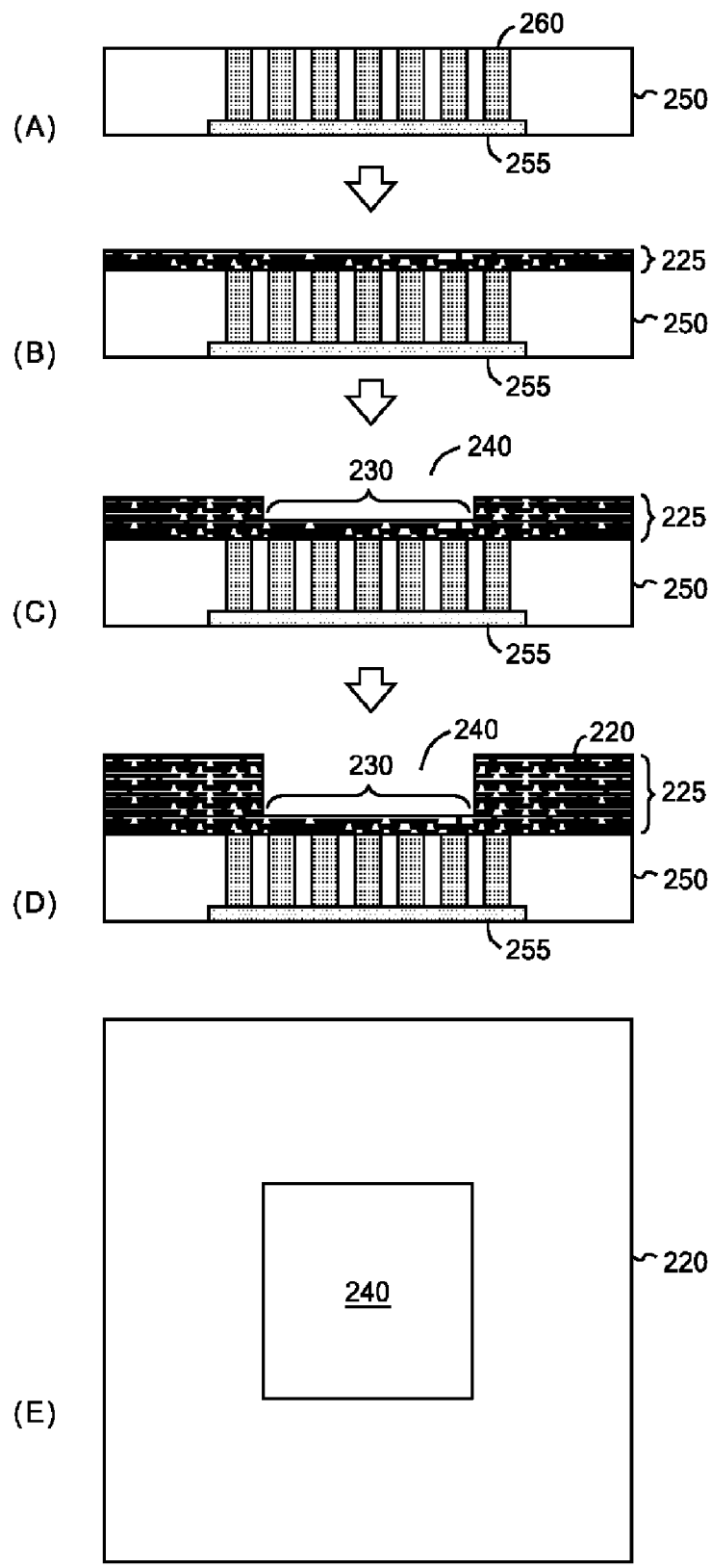
FIG. 19 includes five views that depict a sequence of steps for manufacturing the chip-supporting substrate having the configuration depicted in FIG. 15, according to embodiments consistent with the figures.

FIG. 19 includes five views (A-E) that depict a sequence of steps for manufacturing the configuration example 900 of the chip-supporting substrate 220 (FIG. 15). In view (A), the interposer 250 is prepared. The interposer 250 is prepared so that wiring 255 is formed on its surface with BEOL, electrically conductive through-vias 260 are provided within a range having the size of the plane of the chip in the interposer, and the rear face faces upward. In view (B), the wiring portion 225 is formed on the rear face of the interposer 250, up to the thickness t in the wiring portion 225 of the surface region 230, on which the surface region 230 for arranging the heat sink thereon is set, by stacking a buildup layer, for instance. In view (C), the wiring portion 225 is formed on a portion except for the surface region 230 (length l×length l) on which the surface region 230 for arranging the heat sink thereon is set on the wiring portion 225, so as to become thicker than the thickness "t". Accordingly, the recess 240 is formed on the surface region 230. In view (D), the wiring portion 225 is formed up to a predetermined thickness, and the chip-supporting substrate 220 is completed. A plan view of the configuration example 900 of the completed chip-supporting substrate 220 is illustrated in view (E). In the chip-supporting substrate 220, the recess 240 is formed on the selected surface region 230.

Consistent with certain embodiments, a chip supporting substrate can have a surface region for arranging a heat sink thereon set on a rear face of a wiring portion of the chip supporting substrate. In embodiments, setting the surface region includes determining a set of a cross-sectional area and a length of an electrically conductive layer to satisfy a permissible value of a voltage drop associated with the electrically conductive layer of the wiring portion to be provided, from the permissible value of the voltage drop. Setting the surface region can also include determining a set of lengths of the electrically conductive layer and an insulating layer from a desired value of thermal resistance associated with the electrically conductive layer and the insulating layer of the wiring portion, such that the electrically conductive layer and the insulating layer when having been set so as to have the cross-sectional area out of the set of the cross-sectional area and the length of the electrically conductive layer that has been determined for the permissible value of the voltage drop satisfy the desired value of the thermal resistance. In embodiments, setting the surface region can include selecting a length of an electrically conductive layer corresponding to the cross-sectional area of an electrically conductive layer to be used, from the set of the cross-sectional area and the length of the electrically conductive layer which has been determined for the permissible value of the voltage drop, setting an area determined by the selected length of the electrically conductive layer at the maximum value, selecting lengths of the electrically conductive layer and the insulating layer corresponding to the cross-sectional area of the electrically conductive layer to be used, from the set of the lengths of the electrically conductive layer and the insulating layer which has been determined for the desired value of the thermal resistance, setting an area determined by the selected lengths of the electrically conductive layer and the insulating layer at the minimal value, and setting a surface region for arranging a heat sink thereon to an area in a range between the maximum value and the minimal value, on a rear face of the wiring portion.

Consistent with embodiments, determining the set of the cross-sectional area and the length of the electrically conductive layer includes determining a resistance value of the electrically conductive layer from the permissible value of the voltage drop and a value of an electric current flowing in the electrically conductive layer, and determining a set of the cross-sectional area and the length of the electrically conductive layer to match the determined resistance value.

In certain embodiments, determining the set of the lengths of the electrically conductive layer and the insulating layer includes determining a value of effective thermal conductivity of the wiring portion from a composition ratio between the electrically conductive layer and the insulating layer, determining a value of thermal resistance associated with the electrically conductive layer and the insulating layer with the use of the determined value of the effective thermal conductivity, and determining a set of the lengths of the electrically conductive layer and the insulating layer, such that the determined value of the thermal resistance becomes the desired value of the thermal resistance.

In embodiments, a recess is provided on the rear face of the wiring portion, and a bottom face of the recess becomes the surface region for arranging the heat sink thereon. In certain embodiments, an interposer to be connected to the chip is provided on a surface of the wiring portion, the interposer having an electrically conductive through-via within a range having a size of a plane of a chip.

Consistent with embodiments, a chip mounting structure can include a flip chip, a chip supporting substrate having the flip chip mounted thereon and having a surface region for arranging a heat sink thereon set on a rear face of a wiring portion of the chip supporting substrate. In certain embodiments, and area of the surface region is specified by determining a set of a cross-sectional area and a length of an electrically conductive layer to satisfy a permissible value of a voltage drop associated with the electrically conductive layer of the wiring portion to be provided, from the permissible value of the voltage drop.

In certain embodiments, an area of the surface region is specified by determining a set of lengths of the electrically conductive layer and an insulating layer from a desired value of thermal resistance associated with the electrically conductive layer and the insulating layer of the wiring portion, such that the electrically conductive layer and the insulating layer when having been set so as to have the cross-sectional area out of the set of the cross-sectional area and the length of the electrically conductive layer that has been determined for the permissible value of the voltage drop satisfy the thermal resistance. In particular embodiments, specifying an area of the surface region includes selecting a length of an electrically conductive layer corresponding to the cross-sectional area of an electrically conductive layer to be used, from the set of the cross-sectional area and the length of the electrically conductive layer which has been determined for the permissible value of the voltage drop, setting an area determined by the selected length of the electrically conductive layer at the maximum value, selecting lengths of the electrically conductive layer and the insulating layer corresponding to the cross-sectional area of the electrically conductive layer to be used, from the set of the lengths of the electrically conductive layer and the insulating layer which has been determined for the desired value of the thermal resistance, setting an area determined by the selected lengths of the electrically conductive layer and the insulating layer at the minimal value, and setting the surface region for arranging the heat sink thereon to an area in a range between the maximum value and the minimal value, on a rear face of the wiring portion. Consistent with embodiments, the chip mounting structure can include a heat sink provided on the surface region for arranging the heat sink thereon.

In certain embodiments, determining the set of the cross-sectional area and the length of the electrically conductive layer includes for a chip mounting structure includes determining a resistance value of the electrically conductive layer from the permissible value of the voltage drop and a value of an electric current flowing in the electrically conductive layer, and determining a set of the cross-sectional area and the length of the electrically conductive layer to match the determined resistance value.

In certain embodiments, determining the set of the lengths of the electrically conductive layer and the insulating layer includes determining a value of effective thermal conductivity of the wiring portion from a composition ratio between the electrically conductive layer and the insulating layer, determining a value of thermal resistance associated with the electrically conductive layer and the insulating layer with the use of the determined value of the effective thermal conductivity, and determining a set of the lengths of the electrically conductive layer and the insulating layer, such that the determined value of the thermal resistance becomes the desired value of the thermal resistance.

In particular embodiments, the chip mounting structure includes a second heat sink provided on the flip chip. The chip mounting structure wherein a wiring board having an opening provided at a position corresponding to the surface region for arranging the heat sink thereon is connected to the rear face of the wiring portion by solder.

In certain embodiments of the chip mounting structure, the wiring board is connected to the rear face of the wiring portion through a thermal conductive sheet by solder. In particular embodiments, the chip mounting structure includes a recess provided on the rear face of the wiring portion, and the bottom face of the recess becomes the surface region for arranging the heat sink thereon.

In certain embodiments, the chip mounting structure includes an interposer to be connected to the chip is provided on a surface of the wiring portion, the interposer having an electrically conductive through-via within a range having a size of a plane of a chip.

The descriptions of the various embodiments of the present disclosure have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to explain the principles of the embodiments, the practical application or technical improvement over technologies found in the marketplace, or to enable others of ordinary skill in the art to understand the embodiments disclosed herein.

What is claimed is:

1. A method of selecting, on a rear face of a wiring portion of a chip-supporting substrate, a surface region for positioning of a heat sink thereon, the method comprising:

calculating, in accordance with a specified maximum voltage drop across an electrically conductive wire within the wiring portion of the chip-supporting substrate, a first set of wire lengths and a corresponding first set of wire cross-sectional areas;

selecting, from the first set of wire lengths and from the first set of wire cross-sectional areas, in accordance with a specified maximum combined thermal resistance value of the electrically conductive wire and an electrically insulating layer within the wiring portion of the chip-supporting substrate, a first subset of wire lengths and a corresponding first subset of wire cross-sectional areas;

selecting, from the first subset of wire lengths, a maximum wire length corresponding to the specified maximum voltage drop, the maximum wire length corresponding to a maximum surface region area;

selecting, from the first subset of wire lengths, a minimum wire length, the minimum wire length corresponding to a minimum surface region area; and determining a surface region of the chip-supporting substrate for the positioning of the heat sink, the surface region having an area greater than the minimum surface region area and less than the maximum surface region area.

2. The method of claim 1, wherein calculating the first set of wire cross-sectional areas and the first set of wire lengths includes calculating a maximum electrical resistance value of the electrically conductive wire from the specified maximum voltage drop and from a value of an electric current flowing through the electrically conductive wire, and selecting the first set of wire cross-sectional areas and the first set of wire lengths that result in a electrical resistance of the electrically conductive wire approximating the maximum electrical resistance value.

3. The method of claim 1, wherein selecting the first subset of wire lengths includes determining an effective thermal conductivity of the wiring portion of the chip-supporting substrate from a composition ratio of an amount of electrically conductive wire to an amount of the electrically insulating layer, the selecting further including calculating a combined thermal resistance of the electrically conductive wire and the electrically insulating layer by using the determined effective thermal conductivity, and selecting the first subset of wire lengths that result in the calculated combined thermal resistance approximating the specified maximum combined thermal resistance value.

4. A method for calculating an area of a region for receiving a heat sink on a surface of a chip-supporting substrate, the method comprising:

determining, according to a specified maximum voltage drop of wiring within an electrically conductive layer of the chip-supporting substrate, a first set of electrically conductive wiring cross-sectional areas and a first set of corresponding electrically conductive wire lengths;

determining, by selecting, from the first set of electrically conductive wire lengths, according to a specified maximum thermal resistance associated with at least one electrically conductive layer and at least one insulating layer of the chip-supporting substrate, a first subset of electrically conductive wiring cross-sectional areas and a first subset of corresponding electrically conductive wire lengths;

determining a maximum placement area based upon the first set of electrically conductive wire lengths;

determining a minimum placement area based upon the first subset of electrically conductive wire lengths; and selecting, from a set of placement regions corresponding to the first subset of electrically conductive wiring cross-sectional areas and the first subset of corresponding electrically conductive lengths, a heat sink placement region having a placement area that is greater than the minimum placement area and less than the maximum placement area.

5. The method of claim 4, further comprising determining the first subset of electrically conductive wire lengths by determining a value of effective thermal conductivity of a wiring portion of the chip-supporting substrate from a composition ratio between the at least one electrically conductive layer and the at least one insulating layer of the chip-supporting substrate.

6. The method of claim 4, wherein the determining the first subset of electrically conductive wiring cross-sectional areas and the first subset of corresponding electrically conductive wire lengths includes determining a thickness for an electrically conductive wiring cross-sectional area that is sufficient for multiple layers of wiring within the chip-supporting substrate.

7. The method of claim 4, further comprising positioning a thermally conductive layer between the chip-supporting substrate and a printed circuit board (PCB) and soldering the chip-supporting substrate to the PCB.

8. The method of claim 4, further comprising creating, in the chip-supporting substrate, a recess at the heat sink placement area.

9. The method of claim 8, further comprising placing a heat sink into the recess.

10. The method of claim 9, wherein the chip-supporting substrate is a silicon interposer that includes a microchannel.

* * * * *